(12) United States Patent
Perona et al.

(10) Patent No.: US 11,250,451 B2
(45) Date of Patent: Feb. 15, 2022

(54) DETERMINING REAL-TIME IMPACT OF DIGITAL CONTENT THROUGH DIGITAL SURVEYS

(71) Applicant: Qualtrics, LLC, Provo, UT (US)

(72) Inventors: Nicholas Perona, Orem, UT (US); Evan Child, Provo, UT (US); Bryce Winkelman, Lehi, UT (US)

(73) Assignee: QUALTRICS, LLC, Provo, UT (US)

( * ) Notice: Subject to any disclaimer, the term of this patent is extended or adjusted under 35 U.S.C. 154(b) by 641 days.

(21) Appl. No.: 15/859,269

(22) Filed: Dec. 29, 2017

(65) Prior Publication Data

US 2019/0205908 A1    Jul. 4, 2019

(51) Int. Cl.
*G06Q 30/02* (2012.01)

(52) U.S. Cl.
CPC ..... *G06Q 30/0203* (2013.01); *G06Q 30/0242* (2013.01)

(58) Field of Classification Search
None
See application file for complete search history.

(56) References Cited

U.S. PATENT DOCUMENTS

| 2006/0218036 | A1* | 9/2006 | King | G06Q 30/0203 705/14.55 |
| 2013/0046582 | A1* | 2/2013 | Ramer | G06Q 30/0271 705/7.32 |
| 2015/0324811 | A1* | 11/2015 | Courtright | H04W 4/06 705/7.32 |
| 2015/0358681 | A1* | 12/2015 | Gaston | H04N 21/4758 725/24 |
| 2017/0213236 | A1* | 7/2017 | Sinha | G06Q 30/0243 |

* cited by examiner

*Primary Examiner* — Eric W Stamber
*Assistant Examiner* — Ashley Y Young
(74) *Attorney, Agent, or Firm* — Keller Jolley Preece

(57) ABSTRACT

The present disclosure is directed toward systems, methods, and computer-readable media for determining an impact of digital content by administering a digital survey. In particular, the systems described herein generate a survey administration packet for distribution together with digital content. The survey administration packet causes a respondent client device to perform various functions, including detecting a trigger event and replacing a presentation of digital content with a presentation of a digital survey question. The systems and methods also generate survey results indicating an impact of the digital content based on received digital survey responses.

20 Claims, 13 Drawing Sheets

DETERMINING REAL-TIME IMPACT OF DIGITAL CONTENT THROUGH DIGITAL SURVEYS

BACKGROUND

Advancements in computing devices and networking technology have led to a variety of innovations in providing digital content across computer networks. For example, online digital content systems are now able to serve digital content to users spanning the globe almost instantaneously. Indeed, whether in entertainment, employment, or advertising, modern online digital content systems are able to provide instantaneous digital content to thousands of users via various types of client devices.

Despite these advances however, conventional digital content distribution systems continue to suffer from a number of disadvantages. For instance, while conventional digital content distribution systems can execute digital content campaigns and provide digital content to selected users (e.g., a target audience), these systems are often rigid and inflexible. To illustrate, some conventional digital content distribution systems seek to ascertain the effectiveness of particular digital content (e.g., advertisements) that result in conversions (e.g., purchases) based on a post hoc analysis of purchase statistics. By relying on an analysis of events that occur or are only detectable after a various amount of time after a user is exposed to digital content, conventional digital content distribution systems are imprecise. That is to say, conventional systems gather a diluted sense of the effect that the digital content has on a user or audience because other intervening events that are extraneous to the system may also play a role in influencing a user to purchase a product or service.

In addition, because of the delay in determining conversions, conventional systems are often unable to provide meaningful impression data to a content administrator within an effective timeframe. For example, conventional systems are often delayed by waiting on back-end data (e.g., purchase information) that matches with a presentation of digital content. This delay causes a content advertiser to potentially continue with an ineffective presentation of digital content due to the inefficient system and the delayed data. Thus, the inefficient impression data retrieval from conventional systems results in an inefficient of use of bandwidth and content resources based on potentially providing large amounts of ineffective content to a large number of users.

Such rigidity and imprecision further results in systems that waste computing resources. As mentioned above, some conventional digital content distribution systems are either too slow to conclude, or altogether fail to conclude, that digital content being provided is ineffective to a user or group of users. Thus, the systems store content that is not effective, expend processor resources packaging and sending digital content that is not effective, and utilize bandwidth resources by transmitting digital content that is not effective. In sum, by engaging less receptive users for significant periods of time, conventional digital content distribution systems expend an inefficient amount of resources generating and providing digital content.

Thus, there are several disadvantages with regard to conventional digital content distribution systems.

SUMMARY

One or more embodiments described herein provide benefits and solve one or more of the foregoing or other problems in the art with systems, methods, and non-transitory computer-readable media that determine an impact of digital content by generating a survey administration packet that causes a client device to replace a presentation of the digital content with a digital survey. For instance, In some embodiments, the systems distribute digital content and a generated survey administration packet to a respondent client device. Based on instructions associated with the survey administration packet, a respondent client device presents a digital survey question after a presentation of digital content within the same content presentation platform (e.g., a website). The disclosed systems determine an impact of the digital content to the respondent (and overall on an audience composed of multiple respondents) based on received responses to the digital survey question.

The systems, methods, and computer-readable media accurately and flexibly determine a real-time or near real-time impact of digital content based on providing digital survey questions together with digital content. For instance, based on detecting a trigger event associated with a presentation of digital content, and, in response to the trigger event, replace the presentation of the digital content to with a presentation of or more digital survey questions as part of a digital survey. Thus, the systems allow for the collection of survey responses corresponding to digital content to generate digital survey results that reflect an impact in real-time or near real-time of the digital content in relation to a respondent or a group of respondents.

Additional features and advantages of the present application will be set forth in the description which follows, and in part will be obvious from the description, or can be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
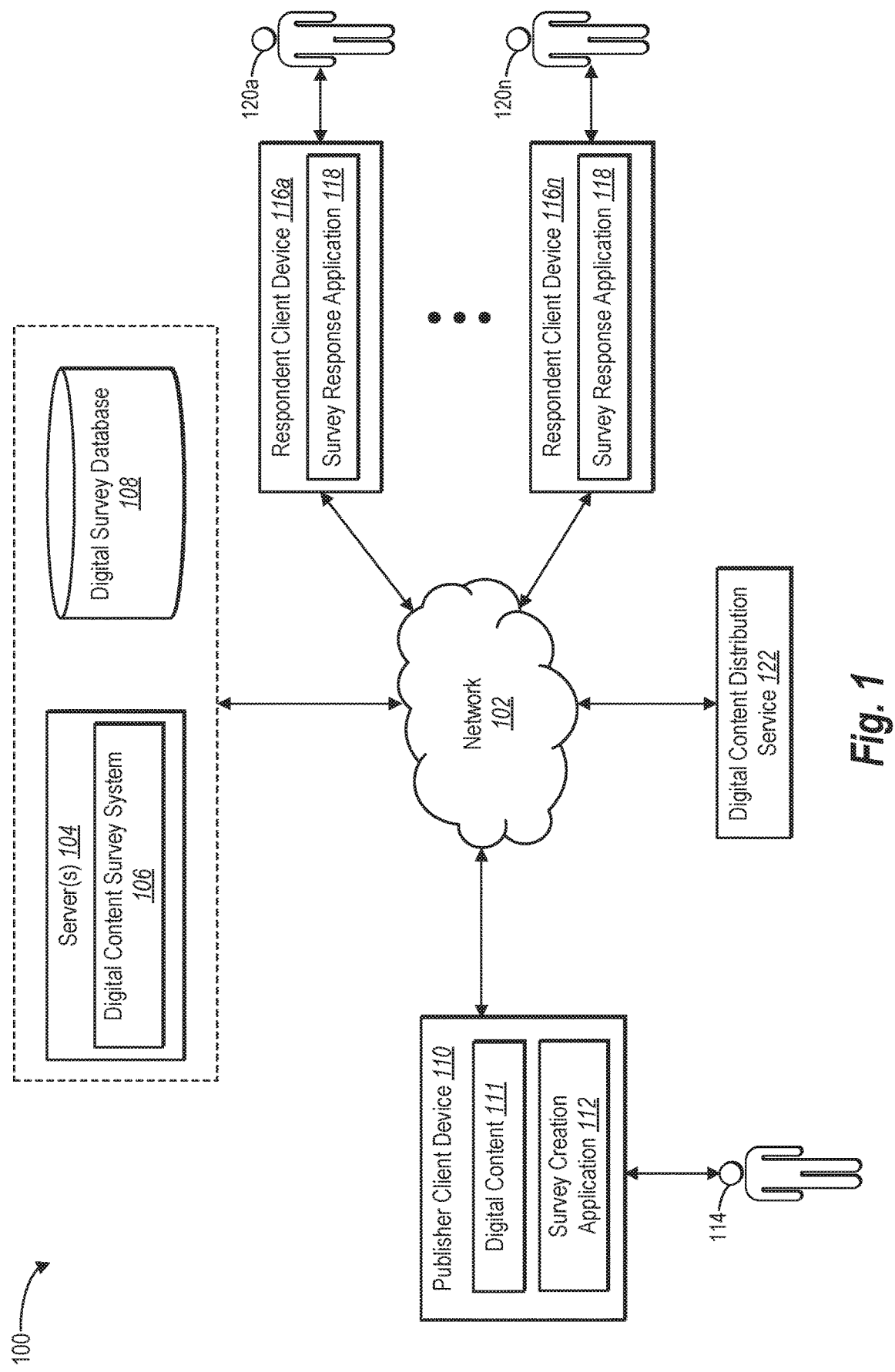
FIG. 1 illustrates a schematic diagram of an example environment of a digital content survey system in accordance with one or more embodiments.

One or more embodiments described herein provide benefits and solve one or more of the foregoing or other problems in the art with a digital content survey system that determines an impact of digital content by generating a survey administration packet that replaces a presentation of digital content with a presentation of a digital survey on a respondent client device. For example, a respondent may access a webpage using a respondent client device. The digital content survey system (or other content distribution provider) can include a presentation of digital content within the webpage. In addition, and in conjunction with the digital content, the digital content survey system can provide instructions that cause the digital content to be replaced by a digital survey question within the webpage. Thus, the digital content survey system provides a survey question related to a specific exposure instance of digital content to respondent on the respondent's client device.

For example, the digital content survey system can distribute, by way of a digital content distribution service, digital content and a generated survey administration packet to a respondent client device. Based on instructions associated with the survey administration packet, the respondent client device first presents digital content (e.g., within a location of webpage), then second presents a digital survey question corresponding to the digital content (e.g., within the same location of the webpage). Accordingly, the digital content survey system can determine an impact of the digital content on the respondent (and on an overall audience composed of multiple respondents) based on a received response to the digital survey question corresponding to the digital content. In this way, the digital content survey system can provide real-time or near real-time responses to flexibly, efficiently, and quickly adapt digital content based on the responses to digital survey questions connected directly to a presentation of digital content.

As described in further detail below, the digital content survey system can generate a survey administration packet for a digital survey that includes at least one digital survey question. The survey administration packet can include instructions for administering a digital survey question in conjunction with digital content. In addition, a digital content publisher (or simply "publisher") can provide digital content (e.g., video, images, advertisement digital media) along with digital content distribution instructions. In turn, the digital content survey system associates the digital content with the survey administration packet.

The digital content survey system can provide the digital content together with the survey administration packet to a digital content distribution service for distribution to respondent client devices. Upon a respondent client device receiving the digital content and the associated survey administration packet, the survey administration packet causes the respondent client device to present the digital content and, after detecting a trigger event defined by the survey administration packet, replace the digital content with a digital survey question. Based on a respondent providing a response to the digital survey question via the respondent client device, the digital content survey system receives a response to the digital survey question. The digital content survey system analyzes the response (and additional responses from several respondents) to determine an impact of the digital content for the respondent as well across an audience of respondents.

As mentioned above, the digital content survey system generates a survey administration packet that corresponds to a digital survey associated with digital content. To generate the survey administration packet, the digital content survey system provides a graphical user interface ("GUI") to a publisher whereby the publisher can select or otherwise input preferences, instructions, survey questions, and other information pertaining to a digital survey corresponding to a presentation of digital content on a respondent client device. For example, the digital content survey system provides a GUI including selectable options to associate a digital survey with a digital content item.

The digital content survey system receives, by way of the above-mentioned GUI and from the publisher, instructions and information pertaining to digital content and a digital survey. Based on the received instructions and information, the survey administration packet can include a survey identifier, a question identifier for each digital survey question, and a link or other indicator that, in response to a detection of a trigger event (e.g., an expiration of a period of time), retrieves, requests or otherwise accesses a digital survey question from the digital content survey system. In these embodiments, upon receiving the request from the respondent client device, the digital content survey system can provide the corresponding digital survey question maintained within a digital survey database.

While in some embodiments the survey administration packet includes a link or other indicator that retrieves or requests a digital survey question from the digital content survey system, the survey administration packet itself can include one or more digital survey questions (e.g., question text and answer choices). Accordingly, in these embodiments, the survey administration packet includes instructions to reconfigure or replace a presentation of digital content and present a digital survey question, stored within the survey administration packet itself, by way of the respondent client device. In other words, the survey administration packet includes instructions and information to present a digital survey question without accessing a digital survey database to request a digital survey question.

In addition to referencing or include a digital survey question, the survey administration packet can further define a trigger event. For example, upon detection of a trigger event, instructions within the survey administration packet can cause a respondent client device to replace the presentation of the digital content with a presentation of a digital survey question. For instance, the survey administration packet can define a trigger event such as, for example, an expiration of a threshold period of time since the digital content was delivered to the respondent client device, or alternatively or in addition, a user interaction with the digital content.

In addition to generating the survey administration packet, the digital content survey system further associates the survey administration packet with digital content. For instance, the digital content survey system associates the survey administration packet with a particular item of digital content, such as a particular video, image, text, or other media content. The digital content survey system associates the survey administration packet with the digital content based on instructions or preferences the publisher provides (e.g., by way of the GUI mentioned above). In particular, the digital content survey system receives an item of digital content that the publisher indicates is to accompany the digital survey having digital survey questions related to the digital content.

After the survey administration packet is associated with digital content, the digital content survey system provides the survey administration packet and the digital content to a digital content distribution service for distribution to respondent client devices. In some embodiments, the digital content survey system generates an exposure data set and a control data set. For example, the survey exposure data set includes the survey administration packet and the digital content for distribution to the respondent client devices. The survey control data set, on the other hand, can include the survey administration packet, while excluding the digital content.

Based on the exposure data sent and the control data set, the digital content survey system causes both the exposure group and the control group to receive a digital survey question, while only the exposure group receives a particular item of digital content. Thus, based on responses received from respondent client devices associated with the exposure data set and respondent client devices associated with the control data set, the digital content survey system can perform real-time or near real-time analysis on an impact of the particular item of digital content. In particular, the digital content survey system analyzes the received responses to generate survey results. Based on the generated results, the digital content survey system determines an impact (e.g., an effectiveness or other value) that the digital content has had on an audience (e.g., an audience composed of the exposure group or the control group). Additional detail regarding determining the impact will be provided below with reference to the figures.

The digital content survey system described herein provides several advantages over conventional digital content distribution systems. For example, the digital content survey system is more flexible than conventional digital content distribution systems. To illustrate, the digital content survey system can flexibly adapt to provide digital content that is more relevant to a given respondent. Indeed, the digital content survey system is capable of tailoring digital content to fit individual respondents based on responses to digital survey questions that are provided directly after exposing a respondent to digital content.

As another advantage, the digital content survey system can determine a real-time or near real-time impact of digital content. Whereas conventional digital content distribution systems may require days or weeks to estimate the impact of digital content, and are typically only capable of doing so for a target audience in general, the digital content survey system described herein determines an impact of digital content almost immediately, and does so on an individual basis. Thus, the digital content survey system provides faster actionable results than conventional digital content distribution systems.

Because the digital content survey system can determine real-time impact of digital content, the digital content survey system is also more effective than conventional digital content distribution systems. For instance, because conventional digital content distribution systems require longer periods of time to gather feedback and other data to determine the effect that a particular digital content item has on a target audience, these conventional systems suffer from inaccuracies due to forgetfulness of respondents, hindsight and/or recency bias, and fading impressions or emotional responses to digital content. By contrast, the digital content survey system collects responses during or immediately after a respondent is exposed to digital content.

Furthermore, the digital content survey system requires fewer communication resources than conventional digital content distribution systems. Particularly, where conventional systems send follow-up messages to solicit feedback from respondents on a post hoc basis, the digital content survey system reduces the number of communications by generating the survey administration packet for distribution together with the digital content, where the survey administration packet includes links to digital survey questions or the digital survey questions themselves, as mentioned above and as described in further detail below.

As used herein, a "digital survey" (or sometimes simply "survey") refers to a set of digital survey questions intended for distribution over a network (e.g., network 102) by way of electronic devices (e.g., smart home devices, computers, smartphones, tablets), and further intended to collect responses to the digital survey questions for generating survey results from the collected responses. A digital survey can include one or more digital survey questions and corresponding answer choices that accompany the given question.

As used herein, a "digital survey question" (or simply "survey question") refers to a prompt included in a digital survey that invokes a response from a respondent, or that requests information from a respondent. Example types of questions include, but are not limited to, multiple-choice, slider, open-ended, ranking, scoring, summation, demographic, dichotomous, differential, cumulative, dropdown, matrix, net promoter score (NPS), singe textbox, heat map, and any other type of prompt that can invoke a response from a respondent. In one or more embodiments, when one or more answer choices are available for a digital survey question, a digital survey question may include a question portion as well as an available answer choice portion that corresponds to the survey question. For example, when describing a multiple-choice survey question, the term survey question may include both the question itself as well as the multiple-choice answers associated with the multiple-choice question.

As used herein, a "survey response" (or simply "response") refers to any type of electronic data representing a response provided to a digital survey question. Depending on the question type, the response may include, but is not limited to, a selection, a text input, an indication of an answer, an actual answer, and/or an attachment. For example, a response to a multiple-choice question may include a selection of one of the available answer choices associated with the multiple-choice question. As another example, a response may include a numerical value, letter, or symbol that that corresponds to an available answer choice. In some cases, a response may include a numerical value that is the actual answer to a corresponding survey question. In addition, a survey response may include other information associated thereto such as, for example, geographical information pertaining to the location of the respondent, a device ID associated with the device by which the respondent responds to the digital survey question, or other metadata associated with respondent/user input.

In addition, the term "respondent" refers to an individual, group of individuals, company, organization, or other entity that responds to one or more digital survey questions as part of a digital survey. Such responses include, but are not limited to a selection of an option from within a set of options (e.g., a set of answer choices) associated with a multiple-choice question, an open-ended text input response, a selection of a rating on a slider bar, etc.

As used herein, a "survey result" or the term "survey results" (or simply "results") refers to a representation of information acquired from a survey response. A survey result can include a simplified representation of a sentiment, opinion, impact, effectiveness, or other information expressed by a respondent in a survey response. In particular, survey results can refer to a report of customer feedback ratings or a summary of poll results based on extracting or otherwise synthesizing quantitative and/or qualitative information from a received survey response.

The term "digital content," as used herein generally refers to any data or information (i.e., content) that a computing device can present to a user. Examples of digital content can include text-based content (e.g., text blocks, titles, tables, etc.) and image-based content (e.g., charts, graphs, graphics, pictures, digital images, maps, gifs, movies, etc.) Additional examples of digital content include digital media, audio/music files, location information, notifications, advertisements, and/or search results. Digital content can be included within a group of digital content items. A group of digital content items does not necessarily include the same or similar digital content items. For example, a group of content items can include a plurality of several different types of digital content items.

More detail regarding the digital content survey system will now be provided with reference to the figures. In particular, FIG. 1 illustrates a schematic diagram of an example environment 100 for implementing a digital content survey system 106 in accordance with one or more embodiments. An overview of the digital content survey system 106 is described in relation to FIG. 1. Thereafter, a more detailed description of the components and processes of the digital content survey system 106 is provided in relation to subsequent figures.

As illustrated by FIG. 1, the chat response environment 100 includes (e.g., may be implemented by) server(s) 104, digital survey database 108, publisher client device 110 associated with digital content publisher 114 (or simply "publisher 114"), respondent client devices 116a-116n (referred to herein collectively as "respondent client devices 116") associated with respondents 120a-120n (referred to herein collectively as "respondents 120"), digital content distribution service 122, and a network 102. Each of the components of the environment 100 can communicate with others of the components via the network 102, and network 102 may be any suitable network over which computing devices can communicate. Example networks are discussed in more detail below with reference to FIG. 10.

As illustrated in FIG. 1, the server(s) 104 include (e.g., host) the digital content survey system 106. The digital content survey system 106 may be implemented by and/or installed on the server(s) 104 as hardware, software, or both. The digital content survey system 106 may be implemented by (e.g., located entirely or in part) on one or more other components of the environment 100. For example, the digital content survey system 106 may be implemented by the publisher client device 110, the server(s) 104, the respondent client devices 116, and/or the network 102.

Additionally, as shown in FIG. 1, the server(s) 104 may include, manage, and/or maintain a digital survey database 108. Indeed, the digital survey database 108 may be located on the server(s) 104 or may be external or from, but accessible to, the server(s) 104 (e.g., within the cloud on remote servers). The digital survey database 108 stores information for digital surveys including digital survey characteristics, digital survey identifiers, digital survey question identifiers, digital survey questions, trigger event information, and digital survey responses.

As used herein, a "publisher client device" refers to a computing device operated by a digital content publisher (e.g., an advertiser, marketer, author, streaming provider, studio, distributor or other publisher of digital content). For example, a publisher client device can include one or more servers, computers, or mobile devices (e.g., smartphones) that communicate with the digital content survey system 106 and/or the respondent client devices 116 via network 102. A publisher client device can generate or maintain digital content (e.g., advertisements) and provide the generated digital content to the digital content survey system 106, whereupon the digital content survey system 106 can provide the digital content to the digital content distribution service 122 for distribution to the respondent client devices 116. The digital content survey system 106 can provide the publisher client device 110 access to the digital content survey system to allow a publisher 114 to create, setup or otherwise input preferences associated with a digital survey to be associated with a digital content campaign.

As used herein, the term "digital content campaign" refers to a series of actions, rules, and/or processes for disseminating digital content. For example, a digital content campaign includes one or more digital content items and one or more campaign parameters for disseminating the digital content. To illustrate, a digital content campaign includes digital content together with campaign parameters for bidding on impression opportunities, sending content items to client devices, or targeting particular client devices and/or users.

As illustrated in FIG. 1, the digital content survey system 106 may communicate with the publisher client device 110 to provide a GUI whereby the publisher 114 can create a digital survey by way of survey creation application 112. A "survey creation application" refers to software and/or hardware that presents a GUI by way of a publisher client device 110 and that enables the publisher 114 to input settings, preferences, digital content, and other information, and to provide the information to the digital content survey system 106 via network 102. A survey creation application may refer to a webpage, a mobile application, a software program, executable hardware instructions, or a combination thereof.

In addition to the survey creation application 111, the publisher client device 110 can include digital content 111. As described above, the publisher client device 110 can create and publish digital content 111 for a digital content campaign. Furthermore, the publisher client device 110 can present the GUI received from the digital content survey system 106 to the publisher 114. Accordingly, the publisher can enter or input preferences, instructions, digital survey questions, and other information pertaining to a digital survey to accompany the digital content 111 by way of the survey creation application 112.

Returning to FIG. 1, the digital content survey system 106 can communicate with the publisher client device 110 to receive the digital content 111 and the information, preferences, etc., pertaining to the digital survey. The digital content survey system 106 can generate a survey administration packet based on the received information, preferences, etc. As used herein, the term "survey administration packet" refers to a packet or package of data that is grouped together, linked, or otherwise associated, and that includes information for a digital survey and/or a digital survey question. In some example embodiments, a survey administration packet can include a survey identifier, a question identifier, and/or trigger event information.

In addition, a survey administration packet can include an indicator or link that instructs a computing device to request, retrieve, or access a digital survey that corresponds to the survey identifier and/or a digital survey question that corresponds to the question identifier. Alternatively, or additionally, the survey administration packet can include digital survey content. For instance, the survey administration packet can include digital survey question text and answer choices for each of a number digital survey questions. Additional detail regarding the survey administration packet is provided below with reference to FIGS. 5A and 5B.

As further illustrated in FIG. 1, the digital content survey system 106 can communicate with the digital content distribution service 122. For instance, the digital content survey system 106 can provide, to the digital content distribution service 122, the digital content 111 and the survey administration packet. As used herein, the "digital content distribution service" refers to a service that includes one or more servers that distribute digital content (e.g., digital content 111) via a network (e.g., network 102). For example, a digital content distribution service can include a media provider such as an internet service provider and/or can include an advertising server, or other service that is capable of distributing digital content (e.g., digital content 111) to computer devices. In some embodiments, the digital content distribution service 122 may be associated with (e.g., located on or maintained by) the publisher client device 110.

Indeed, the digital content survey system 106 and/or the digital content distribution service 122 can communicate with the respondent client devices 116 to distribute the digital content 111 together with the survey administration packet. To illustrate, the digital content distribution service 122 can provide a video to respondent client device 116a via network 102, whereby respondent client device 116a can present the video to the respondent 120a.

As used herein, the term "respondent client device" refers to any of a variety of computing devices such as mobile devices, desktop computers, laptop computer, tablets, or wearable devices. A respondent client device is capable of communicating across network 102 with the other components of the environment 100 to receive and transmit data including digital content 111 and the survey administration packet, and is further capable of presenting, via a display, the digital content 111 and a digital survey question. Each of the respondent client devices 116 can include the same type of functionality consistent with the disclosure herein, but need not be the same type of device. Additional information regarding computing devices (e.g., servers and client devices) is provided below with respect to FIG. 9.

As illustrated in FIG. 1, the respondent client devices 116 are capable of receiving user input from respondents 120 in the form of user interaction with digital content 111 or input of responses to digital survey questions. For instance, the respondent client devices 116 each include survey response application 118. The survey response application 118 is capable of presenting digital content 111 as well as a digital survey question and answer choices. The survey response application 118 further provides the respondent client devices 116 the ability to communicate with the digital content survey system 106 and/or the digital content distribution service 122 to receive the digital content 111 and to provide responses to digital survey questions.

As used herein, the term "survey response application" refers to hardware and/or software that enables a respondent client device (e.g., respondent client device 116a) to receive digital content, present digital content, receive a digital survey, present digital survey questions associated with the digital survey, receive user input for answers to digital survey questions, and provide responses to digital survey questions corresponding to the answers received via user input. A survey response application may refer to a webpage, a mobile application, a software program, executable hardware instructions, or a combination thereof.

Based on the received responses, the digital content survey system 106 can generate survey results, as mentioned above. In particular, the digital content survey system 106 can analyze the received responses to determine an impact of the digital content 111 with relation to each of the respondents 120 individually and as a group. The digital content survey system 106 can further communicate with the publisher client device 110 to provide the survey results. Additional detail regarding generating the survey results, including a discussion of determining the impact of the digital content 111, is provided below with reference to the subsequent figures.

With reference to FIGS. 2-8, one or more components of the digital content survey system 106 can manage, along and/or in combination with other components of the environment 100, a digital survey corresponding to digital content. For example, FIGS. 2A-2B illustrate an example sequence 200 that includes a number of acts 202-226. One or more of the components described in FIG. 1 perform the acts described in relation to FIGS. 2A-2B. Although FIGS. 2A-2B depict particular components performing particular acts 202-226, in some embodiments alternative or additional components can perform the acts 202-226 described in relation to FIGS. 2A-2B. Additionally, although FIGS. 2A-2B illustrate a particular number of acts 202-226 and a particular sequence in which the acts 202-226 are performed, in some embodiments the sequence 200 can include more or fewer acts, and the acts can be perform in an alternative order or arrangement.

Figure 2A:
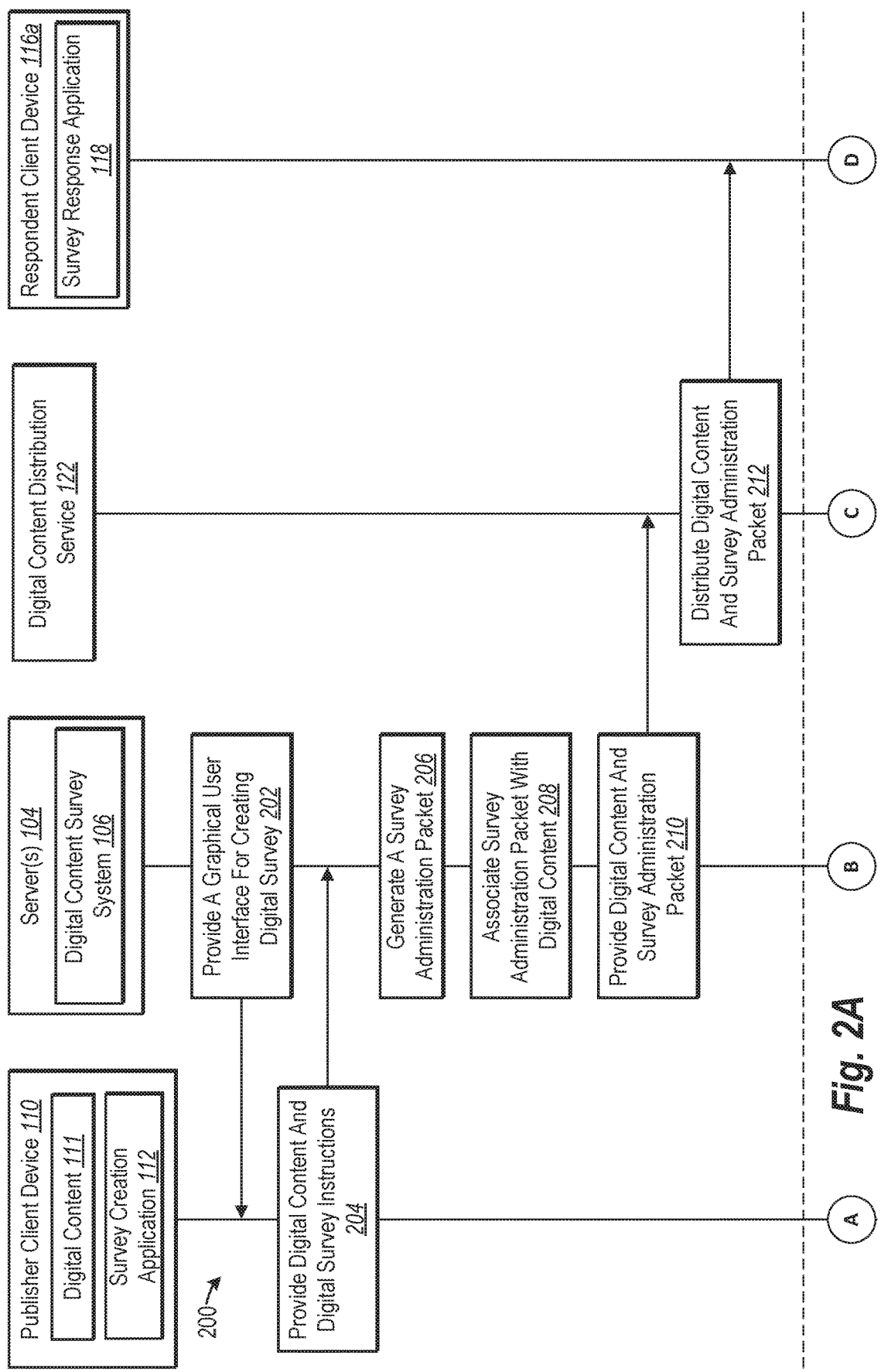
FIGS. 2A-2B illustrate a sequence diagram for determining an impact of digital content via a digital survey in accordance with one or more embodiments.

As illustrated in FIG. 2A, the sequence 200 includes acts performed by the publisher client device 110, the digital content survey system 106 (e.g., as implemented by the server(s) 104), the digital content distribution service 122, and a respondent client device 116a. Although the environment 100 includes multiple respondent client devices 116, it will be beneficial to describe the functioning of the digital content survey system 106 and other actors/components with reference to a single respondent client device 116a—and in some cases a different or additional respondent client device 116b.

The digital content survey system 106 performs act 202 to provide a graphical user interface ("GUI") for creating a digital survey to the publisher client device 110. The digital content survey system 106 provides a GUI that includes options for setting a trigger event, setting a control group size, an exposure group size, indicating whether the digital survey is linked or embedded, etc. Additional detail regarding the GUI is provided below with reference to FIG. 3.

The digital content survey system 106 provides the GUI to the publisher client device 110, whereupon the publisher client device 110 provides digital content 111 and digital survey instructions to the digital content survey system 106, as indicated by act 204 of sequence 200. To illustrate, the publisher 114 inputs digital survey instructions in the GUI by way of the survey creation application 112. The digital survey instructions include the above-mentioned settings for a trigger event, a control group size, an exposure group size, indicating whether the digital survey is linked or embedded, etc., as described further in FIG. 3. To provide the digital content 111, the publisher client device 110 uploads, transfers, or otherwise transmits the digital content 111 together with the digital survey instructions to the digital content survey system 106 (e.g., via network 102).

The digital content survey system 106 receives the digital content 111 and the digital survey instructions, whereupon the digital content survey system 106 generates a survey administration packet, as illustrated by act 206. To generate the survey administration packet, the digital content survey system 106 analyzes the received digital survey instructions and performs the necessary functions to create a data package that includes computer instructions and information capable of causing a computer device to perform various functions. For instance, the survey administration packet can include the settings for the trigger event, a control group size, an exposure group size, a survey identifier associated with the digital survey, and/or one or more question identifiers associated with each digital survey question that are part of the digital survey.

In addition, the digital content survey system 106 can generate a linked survey administration packet that includes a link (e.g., a pointer or other indicator) to each digital question that is part of the digital survey as stored on the digital survey database 108. The digital content survey system 106 can also generate an embedded survey administration packet that includes digital survey content (e.g., the digital survey questions themselves, including question text and answer choices). Indeed, the digital content survey system 106 may generate a survey administration packet to be either linked, embedded, or a combination of linked and embedded. For instance, the survey administration packet links to certain digital survey questions and directly includes digital survey questions.

Based on the above description of the survey administration packet, "linked survey," as used herein, refers to digital survey wherein the corresponding survey administration packet is of the variety that includes the link or pointer to the digital survey database 108 (e.g., does not include digital survey question text or answer choices therein). This type of survey administration packet may be referred to as a "linked survey administration packet." In addition, an "embedded survey" refers to a digital survey wherein the corresponding survey administration packet is of the variety that includes the digital survey (e.g., including digital question text and answer choices) therein. This type of survey administration packet may be referred to as an "embedded survey administration packet." A combination survey that includes both linked survey information and embedded survey information may be referred to as a "hybrid survey administration packet."

As illustrated in FIG. 2A, the digital content survey system 106 further performs an act 208 to associate the survey administration packet with the digital content 111. In particular, the digital content survey system 106 generates an exposure data set that includes the digital content 111 and the survey administration packet. As used herein, the term "exposure data set" refers to a package of computer data or information composed of two or more distinct portions that are grouped together for simultaneous distribution to computer devices. An exposure data set can include digital content (e.g., digital content 111) and the survey administration packet. Indeed, the term "exposure" refers to the act of exposing a respondent to the digital content 111.

Additionally, the digital content survey system 106 generates a control data set that includes only the survey administration packet and does not include the digital content 111. As used herein, the term "control data set" refers to a package of computer data or information composed of a single portion that includes digital survey information, but does not include digital content. The control data set is purposefully lacking digital content because the control data set is for distribution to a control group.

As mentioned, the digital content survey system 106 generates both a control data set and an exposure data set. Indeed, the digital content survey system 106 generates the control data set for distribution to a number of the respondent client devices 116 that corresponds with a control group size indicated by the publisher 114 via the GUI mentioned above. Generally, the control group is a number of respondent client devices 116 fewer than the total number of respondent client devices 116. The digital content survey system 106 generates the control data set for distribution to respondent client devices 116 to cause the respondent client devices 116 to present one or more digital survey questions without presenting the digital content 111.

The digital content survey system 106 generates the exposure data set for distribution to an exposure group. The exposure group is a number of respondent client devices 116 fewer than the total number of respondent client devices 116 and different from the respondent client devices 116 associated with the control group. Indeed, the digital content survey system 106 generates the exposure data set for distribution to respondent client devices 116 to cause the respondent client devices 116 to present the digital content 111 and, after detecting a trigger event, to present a digital survey question.

As used herein, the term "trigger event" refers to an occurrence, action, or instance of a particular event that triggers or causes a computer device to perform specific functions. For example, a trigger event can include the expiration of a threshold period of time, where, upon detecting the expiration of the threshold period of time, a respondent client device (e.g., respondent client device 116a) replaces a presentation of digital content (e.g., digital content 111) with a presentation of a digital survey question. As another example, a trigger event can include detecting a user input (e.g., a user interaction with the digital content 111), whereupon the respondent client device 116a replaces the presentation of the digital content 111 with a presentation of a digital survey question. Alternatively, upon detecting a user interaction with the digital content 111, respondent client device 116a (as instructed by the survey administration packet) can automatically (e.g., without user interaction) populate, generate, and/or provide survey responses for digital survey questions to the digital content survey system 106.

For example, in some embodiments, the digital content survey system 106 generates a control data set that includes a linked survey administration packet (referred to herein as a "linked control data set") and also generates an exposure data set that includes a linked survey administration packet (referred to herein as a "linked exposure data set"). In other embodiments, the digital content survey system 106 generates a control data set that includes a linked survey administration packet and generates an exposure data set that includes an embedded survey administration packet (referred to herein as an "embedded exposure data set"). In still other embodiments, the digital content survey system 106 generates a control data set that includes an embedded survey administration packet (referred to herein as an "embedded control data set") and an exposure data set that includes a linked survey administration packet. In further embodiments, the digital content survey system 106 generates a control data set that includes an embedded survey administration packet and an exposure data set that also includes an embedded survey administration packet.

In still further embodiments, the digital content survey system 106 generates a control data set of one type (e.g., a linked control data set or an embedded control data set) for distribution to respondent client device 116*a* and generates a control data set of a different type for distribution to a different respondent client device 116*b*. Likewise, the digital content survey system 106 can generate different types of exposure data sets for distribution to different respondent client devices 116.

Returning to FIG. 2A, as shown by the sequence 200, the digital content survey system 106 further performs act 210 to provide the digital content 111 and the survey administration packet to a digital content distribution service 122. As mentioned above, the digital content survey system 106 provides the digital content 111 and the survey administration packet together in the form of an exposure data set. Though not explicitly shown in FIG. 2A, in some embodiments, the digital content survey system 106 further provides a control data set to the digital content distribution service 122, which includes the survey administration packet but does not include the digital content 111.

As also illustrated in FIG. 2A, the digital content distribution service 122 distributes the digital content 111 and the survey administration packet to the respondent client device 116*a*, as shown in act 212. Indeed, the digital content distribution service 122 distributes the exposure data set to the respondent client device 116*a*. Accordingly, the respondent client device 116*a* belongs to the exposure group described above. Thus, the survey administration packet causes the respondent client device 116*a* to, by way of the survey response application 118, perform specific acts or functions described hereafter.

Though not illustrated in FIG. 2A, the digital content distribution service 122 further distributes the control data set to a different respondent client device (e.g., respondent client device 116*b*). As mentioned above, the digital content survey system 106 designates a control group apart from the exposure group that consists of a subset of the respondent client devices 116 that do not receive the digital content 111 but receive only the survey administration packet.

As mentioned, the survey administration packet causes the respondent client device 116*a* to perform specific acts 214-218. Continuing the sequence 200 to FIG. 2B, the respondent client device 116*a* performs the act 214 to present the digital content 111. For example, the respondent client device 116*a* presents a video or image by way of the survey response application 118. For example, the respondent client device presents digital content (e.g., an advertisement) within a webpage. In the case of a webpage, the exposure data set can be included within the webpage code that, when rendered by the survey response application (e.g., a web browser), causes the webpage to present the digital content within a portion of the webpage.

The respondent client device 116*a* further performs act 216 to detect a trigger event. As mentioned above, the survey administration packet includes the trigger event information (e.g., the information that defines the trigger event). Accordingly, the survey administration packet causes the respondent client device 116*a* to detect a trigger event such as, for example, the expiration of a threshold period of time since the respondent client device 116*a* began presenting the digital content 111. Other trigger events include, but are not necessarily limited to, detecting user interaction (e.g., input) from the respondent 120*a* with the digital content 111 or the expiration of a threshold period of time since the digital content distribution service 122 first distributed the digital content 111 and/or the survey administration packet.

Figure 2B:
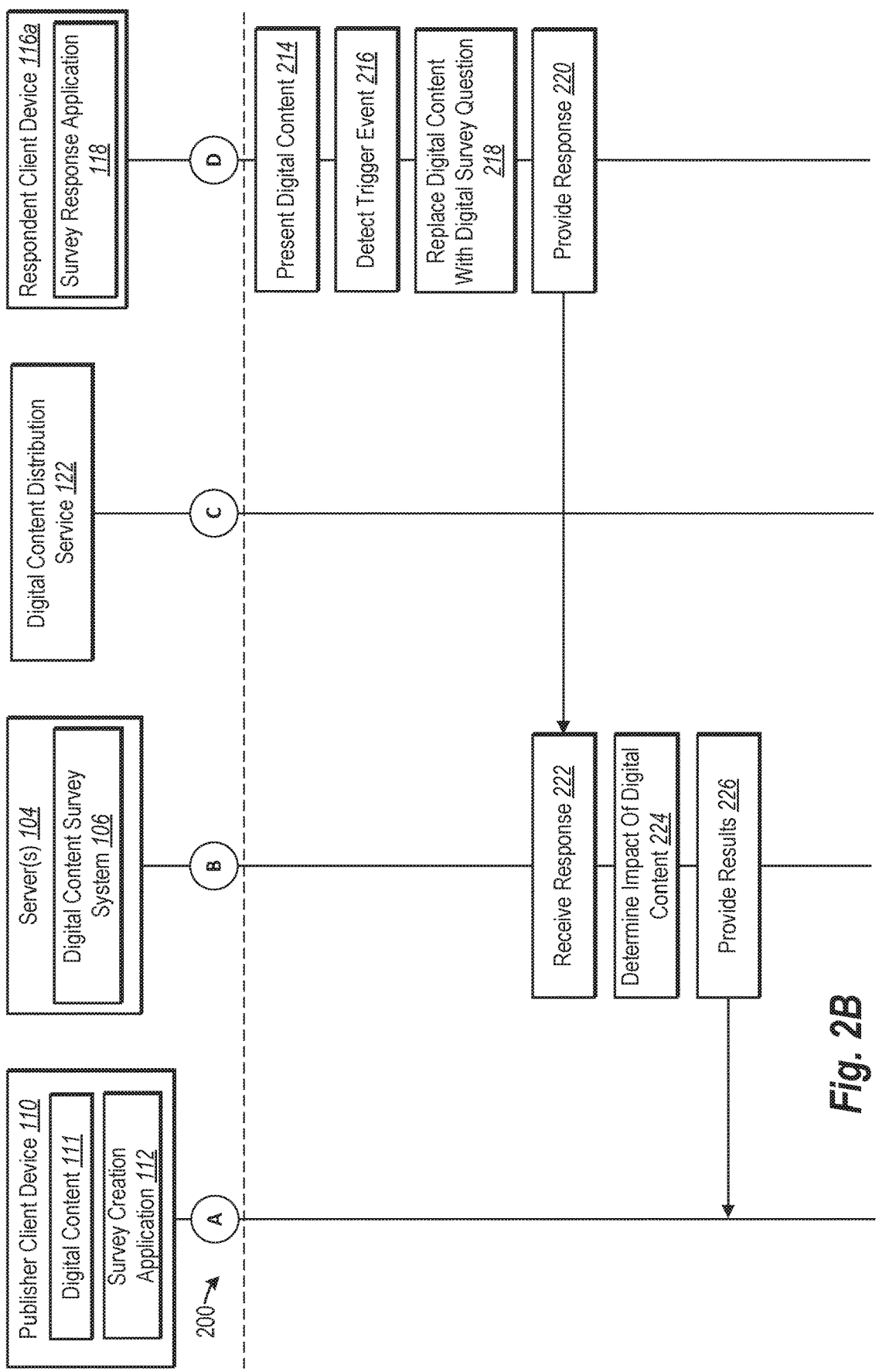

As further illustrated by FIG. 2B, the respondent client device 116*a* replaces the presentation of the digital content 111 with a presentation of a digital survey question, as depicted by act 218. In particular, the survey administration packet includes instructions to cause the respondent client device 116*a* to, in response to detecting the trigger event (act 216), replace the digital content with a digital survey question. For example, referencing the above case of presenting digital content within a portion of a webpage, upon detecting the trigger event, instructions within the survey administration packet cause the respondent client device to replace the digital content 111 with a digital survey question within the portion of the webpage within which previously included the digital content. In other embodiments, the digital survey question does not replace the digital content, but rather modifies the digital content to allow the survey question to be included within the portion of the webpage (e.g., reduces the size of the digital content). In other embodiments, the digital survey question is provided within another portion of the webpage, thus, allowing the presentation of the digital content to remain within the webpage, if desired.

In embodiments where the respondent client device 116*a* receives a linked survey administration packet, the respondent client device 116*a* requests access to a digital survey question maintained by the digital content survey system 106 on the digital survey database 108. On the other hand, in embodiments where the respondent client device 116*a* receives an embedded survey administration packet, the respondent client device 116*a* replaces the digital content 111 with a local digital survey question included with (e.g., as part of) the survey administration packet, again per the instructions of the survey administration packet.

Continuing with the sequence 200 of FIG. 2B, the respondent client device 116*a* further performs the act 220 to provide a response to the digital content survey system 106. In particular, the respondent client device 116*a* receives user input from the respondent 120*a* to select or input answer choices for one or more digital survey questions. In response to receiving the answer choices, the respondent client device 116*a* generates a survey response including the answer choices and provides (e.g., transmits) the survey response to the digital content survey system 106.

In some embodiments, the respondent client device 116*a* provides (as instructed by the survey administration packet) a survey response for each individual digital survey question at a time, providing a response each time the respondent 120*a* provides an answer for a given digital survey question. In other embodiments, the respondent client device 116*a* provides a survey response as a bundle at the end of the digital survey (e.g., as indicated by the last digital survey question of the digital survey) that includes survey responses for each digital survey question.

In some embodiments, such as (but not limited to) where the survey administration packet defines the trigger event as detecting user interaction with the digital content 111, the respondent client device 116*a* automatically generates survey responses. To illustrate, the survey administration packet may include, or link to, a digital survey question that asks, for example, "Was this digital content interesting to you?" Based on detecting a user interaction (e.g., a click, tap, touch, press, or other user input) with the digital content, the respondent client device 116*a* can automatically generate a survey response to the digital survey question indicating that the respondent 120*a* found the digital content 111 interesting. In other words, without ever explicitly providing a digital survey question for presentation to a respondent, the survey administration packet can include instructions to automatically provide a survey response to one or more digital survey questions based on a user interaction or lack of user interaction with the digital content.

Similarly, based on the information included in the survey administration packet, the respondent client device 116a can automatically generate survey responses that vary along a spectrum of possible answer choices. For example, a survey administration packet may include, or link to, a digital survey question that includes multiple answer choices in a sliding scale type digital survey question (e.g., a scale from 1 to 10) that asks, "How likely are you to purchase the depicted product in the next month, with 1 being least likely and 10 being most likely?" The survey administration packet may cause the respondent client device 116a to time how long it takes for the respondent 120a to interact with the digital content 111.

To illustrate, the respondent client device 116a may determine an amount of time that elapses between when the respondent client device 116a first begins presenting the digital content 111 and when the respondent 120a interacts with the digital content 111. Based on how long it takes for the respondent 120a to interact with the digital content 111, the survey administration packet may cause the respondent client device 116a to automatically generate a survey response corresponding to a particular number on the scale from 1 to 10 that illustrates the desire or necessity of the respondent 120a in purchasing the product depicted in the digital content 111. Indeed, a very short time (i.e., a fast user interaction) may correspond with a higher number (e.g., 8, 9, or 10), while a longer time may correspond with a lower number. In another embodiment, the survey administration packet may cause the client device to detect that a user hovers over (e.g., with a mouse pointer) the digital content, but does not select it. Based on the hover interaction, the client device can automatically send one or more responses as described above.

Furthermore, the survey administration packet may cause the respondent client device 116a to swap digital content. To illustrate, the survey administration packet may include more than one digital content item and may cause the respondent client device 116a to, upon detecting a negative sentiment (e.g., a selection of an answer choice that reflects negative sentiment), replace the digital content 111 with a different digital content. In some embodiments, the survey administration packet includes only digital content 111 and does not include any additional digital content. In these or other embodiments, the survey administration packet causes the respondent client device 116a to, upon detecting a negative sentiment, replace the digital content 111 by requesting additional or alternative digital content from the digital content survey system 106, the digital content distribution service 122, and/or the publisher client device 110.

Although not illustrated in FIG. 2B, the digital content distribution service 122 distributes the control data set to a control group that includes those respondent client devices 116 that are not part of the exposure group, as mentioned above. In the case of one these control group respondent client devices 116, such as respondent client device 116b for example, the survey administration packet causes the respondent client device 116b to perform a different series of acts than those depicted in relation to the respondent client device 116a of the exposure group.

To illustrate, the survey administration packet causes the respondent client device 116b to present a digital survey question without first presenting any digital content (e.g., digital content 111). Thus, the respondent client device 116b need not detect a trigger event to cause the respondent client device 116b to replace digital content with a digital survey question. Instead, the respondent client device 116b presents the digital survey question in lieu of the digital content 111, in the place where the respondent client device 116b would otherwise have presented the digital content 111. Additional detail regarding the differences in acts performed by respondent client devices 116a (exposure group) and 116b (control group) is provided below in relation to FIG. 4.

In any case, the respondent client device 116a (or 116b) provides a survey response to the digital content survey system 106, as illustrated by act 220. Accordingly, the digital content survey system 106 performs act 222 of sequence 200 to receive the survey response. Upon receiving the survey response to each digital survey question, either all at once or one at a time (as described above), the digital content survey system 106 performs act 224 of sequence 200 to determine an impact of the digital content 111.

As used herein, the term "impact" refers to an indication of an effectiveness of, or attitude or sentiment that a respondent (e.g., respondent 120a) exhibits toward, digital content (e.g., digital content 111). An impact may refer to an overall impact or effectiveness as an average or collective determination over an entire audience (e.g., respondents 120 corresponding to respondent client devices 116), or else an impact may refer to an impact that the digital content 111 has with regard to a single respondent (e.g., 116a or 116b) on an individual level.

As mentioned, the digital content survey system 106 determines an impact of the digital content 111. Based on the determined impact, the digital content survey system 106 further performs act 226 to provide results to the publisher client device 110. Indeed, the digital content survey system 106 generates results that indicate the impact of the digital content 111, based on, for example, analyzing the responses received from the respondent client devices 116. For instance, the digital content survey system 106 may analyze the survey responses using text analysis techniques, machine learning models (e.g., deep learning, neural networks, etc.), statistical models, and other techniques as mentioned above to determine the impact and then provide an indication of the impact to the publisher client device 110 via survey results.

Figure 3:
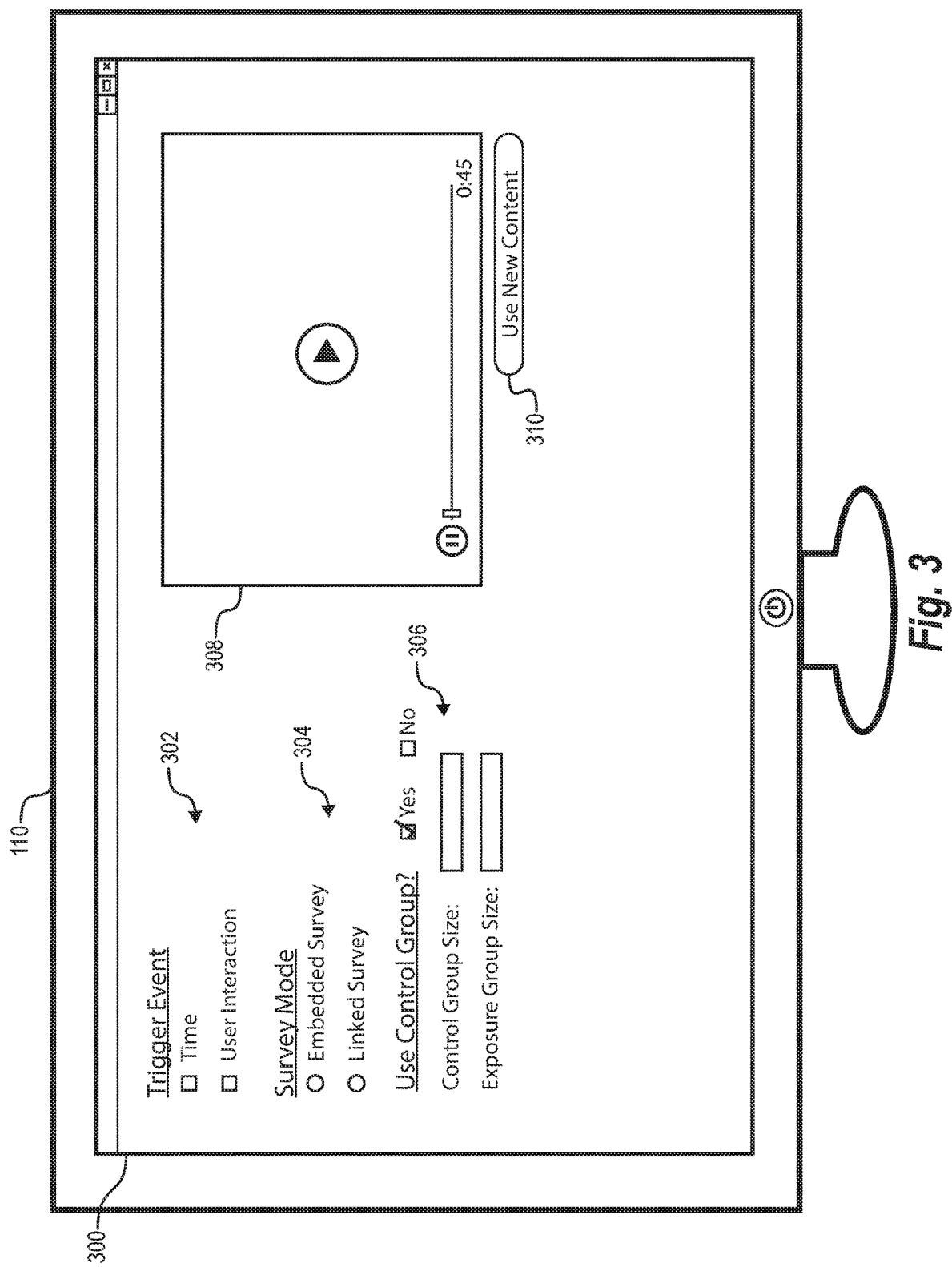
FIG. 3 illustrates an example graphical user interface provided to a publisher client device in accordance with one or more embodiments.

As described briefly above, and as FIG. 3 illustrates, the digital content survey system 106 generates and provides a GUI to the publisher client device 110, whereby the publisher 114 enters digital survey preferences, uploads digital content (e.g., digital content 111), sets control and exposure group preferences, and/or otherwise organizes a digital content campaign. FIG. 3 illustrates publisher client device 110 presenting the GUI 300 that includes trigger event settings 302, a survey mode option 304, control group settings 306, digital content portion 308, and digital content option 310. Additional detail regarding the elements of the GUI 300 are provided hereafter. Furthermore, although FIG. 3 illustrates a particular layout and arrangement of the GUI 300, the GUI 300 is merely an example, and other layouts and arrangements are possible and may include more or fewer elements than those illustrated in FIG. 3.

The GUI 300 of FIG. 3 includes trigger event settings 302. As illustrated in FIG. 3, the trigger event settings 302 enable a publisher 114 to select which type of trigger event to use. For instance, the publisher 114 can select either a time-based trigger event (as described above) or a user interaction-based trigger event (also described above), or both. In addition to providing options to selection which type of trigger event to use, the GUI 300 may also include options for the publisher 114 to enter an amount (e.g., duration) of time to define a time-based trigger event. Additionally, the GUI 300 may include options for the publisher to select a type of user interaction to use as the user interaction-based trigger event. For example, the type of user interaction can include a selection (e.g., click, touch, tap, etc.) of the digital content 111, a muting of any audio included in the digital content 111, a selection to turn on any audio included in the digital content 111, or a selection of a terminate/close option associated with the digital content.

As illustrated in FIG. 3, the GUI 300 further includes a survey mode option 304. The survey mode option 304 may include user selectable options for the publisher 114 to select which type of digital survey to use. For example, the survey mode option 304 can include an option to select either an embedded survey or a linked survey, as described above. Indeed, in response to receiving an indication from the publisher client device 110 that the publisher 114 selects the embedded survey option, the digital content survey system 106 generates an embedded survey administration packet. Upon receiving an indication that the publisher 114 selects the option to use a linked survey, on the other hand, the digital content survey system 106 generates a linked survey administration packet, as described in further detail above.

As further illustrated in FIG. 3, the GUI 300 includes control group settings 306. In particular, the control group settings 306 include an option for the publisher to select to use a control group or to select to not use a control group. Based on detecting that the publisher 114 selects the option to use a control group, the GUI 300 is configured to present options for the publisher 114 to enter a control group size and an exposure group size. The control group size and the exposure group size may refer to a number of respondents 120 that will receive the control data set and the exposure data set, respectively.

FIG. 3 further illustrates that the GUI 300 includes a digital content portion 308. In particular, the digital content portion 308 represents the digital content 111 that the publisher chooses to include with the digital survey as part of the digital content campaign. The digital content portion 308 may include one or more digital content items. Indeed, the publisher 114 can choose to add additional or alternative digital content by selecting the digital content option 310.

As mentioned, the GUI 300 of FIG. 3 further includes a digital content option 310. Upon detecting a selection of the digital content option 310, the GUI 300 is configured to enable the publisher to upload or otherwise add additional or alternative digital content to be associated with the digital survey. In cases where the publisher 114 chooses to include more than one digital content item as part of the digital content campaign, the digital content survey system 106 may perform the acts described above in relation to FIGS. 2A and 2B with respect to each digital content item. For example, the digital content survey system 106 may determine an impact of each individual digital content item. Alternatively, the digital content survey system 106 may determine a collective impact of the digital content campaign as a whole, across all included digital content items. Accordingly, by providing the GUI 300 to the publisher client device 110, the digital content survey system 106 enables the publisher 114 to organize a digital content campaign. Based on the input of the publisher 114, the digital content survey system 106 generates a digital survey and carries out a digital content campaign.

Figure 4:
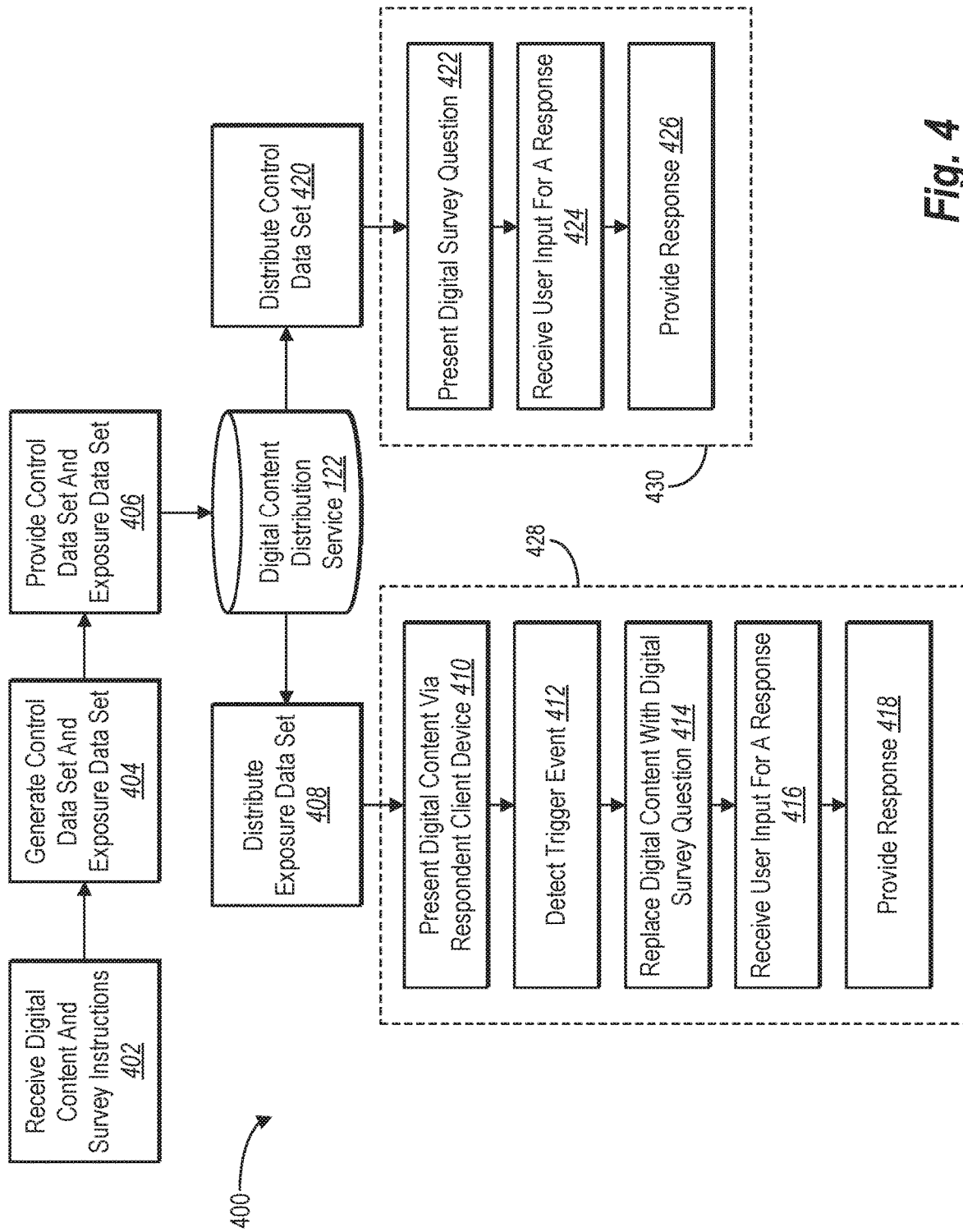
FIG. 4 illustrates an example sequence for distributing digital content and a digital survey to an exposure group and a control group in accordance with one or more embodiments.

FIG. 4 illustrates a sequence 400 of acts 402-426 performed by the digital content survey system 106 and/or other components of the environment 100 described above. As illustrated in FIG. 4, the digital content survey system 104 receives the digital content (e.g., digital content 111) and the survey instructions (e.g., the input received from the publisher client device 110 by way of the GUI 300), as shown in act 402. For example, the digital content survey system 106 receives indications of trigger event type, survey mode (e.g., embedded or linked), control group size, exposure group size, etc. The digital content survey system 106 further receives the digital content 111 that is to accompany the digital survey.

Based on the received information, the digital content survey system 106 generates a digital survey for the digital content 111. Indeed, as illustrated in FIG. 4, the digital content survey system 106 performs act 404 to generate control data set and an exposure data set. As described above, the control data set includes a survey administration packet but does not include the digital content 111. On the other hand, the exposure data set includes both the survey administration packet and the digital content 111. As also described above, the survey administration packet included within the control data set and/or the exposure data set may be either linked or embedded.

FIG. 4 further illustrates that the digital content survey system 106 performs act 406 to provide the control data set and the exposure data set to the digital content distribution service 122. Indeed, based on the information received from the publisher client device 110 (e.g., via the GUI 300), the digital content survey system 106 provides a control data set for distribution to a particular number of respondent client devices 116 that are associated with the control group. Likewise, the digital content survey system 106 provides an exposure data set for distribution to a particular number of respondent client devices that are associated with the exposure group.

To determine which respondents 120 belong to the control group and which respondents 120 belong to the exposure group, the digital content survey system 106 may analyze a potential audience. For example, the digital content survey system 106 may determine a number of respondent client devices 116 to include within each of the exposure group and the control group based on the information received from the publisher client device 110 via GUI 300. In addition, the digital content survey system 106 generates a control group for the purpose of determining the impact of the digital content 111—e.g., to show the effect that the digital content 111 has on respondents 120 who are exposed to the digital content 111 versus those respondents 120 who are not.

In some embodiments, the digital content survey system 106 generates a random control group, while in other embodiments the digital content survey system 106 generates a control group consisting of respondents 120 who represent various demographics. For instance, the digital content survey system 106 generates a control group that includes respondents 120 of each sex, of varying ages, location, income, ethnicity, race, or other demographic.

In any case, the digital content survey system 106 provides the control data set and the exposure data set to the digital content distribution service 122. As illustrated in FIG. 4, the digital content distribution service 122 distributes the exposure data set by performing act 408 and distributes the control data set by performing act 410. Indeed, as illustrated in FIG. 4, the box 428 represents the exposure group and the box 430 represents the control group. Additionally, the acts depicted within the boxes 428 and 430 represent acts that the survey administration packet causes a given respondent client device (e.g., 116a for the exposure group or 116b for the control group) to perform.

As illustrated in FIG. 4, the sequence 400 further includes act 410 to show that the survey administration packet causes the respondent client device 116a to present the digital content 111. The respondent client device 116a presents the digital content 111 to the respondent 120a and further performs act 412 to detect a trigger event. As described above, the respondent client device 116a detects a time-based trigger event and/or a user interaction-based trigger event. Based on detecting the trigger event, the respondent client device 116a then replaces the presentation of the digital content 111 with a presentation of a digital survey question (e.g., the first digital survey question of the digital survey).

To replace the digital content 111 with the digital survey question, the respondent client device 116a may access or otherwise load the digital survey question and present the digital survey question in the same location on a screen of the respondent client device 116a—i.e., the location where the respondent client device 116a presented the digital content 111. In other embodiments, the respondent client device 116a presents the digital survey question together with the digital content 111. For instance, the respondent client device 116a presents the digital survey question within a sub-window or nested portion of the presentation of the digital content 111.

As further illustrated in FIG. 4, the respondent client device 116a receives user input for a response, as shown by act 416. In particular, the respondent client device 116a receives user input in the form of a selection or other input of an answer to the digital survey question. Based on the received answer, the respondent client device 116a provides a survey response that includes each answer to each respective digital survey question (e.g., either in turn or altogether, as described above) to the digital content survey system 106, as shown by act 418 of sequence 400.

As mentioned above, the digital content distribution service 122 performs act 420 to distribute the control data set to the control group (e.g., including respondent client device 116b). Upon receiving the control data set, the respondent client device 116b presents the digital survey question, as illustrated by act 422. In particular, the respondent client device 116b refrains from presenting the digital content 111 or else simply does not present the digital content 111 because the respondent client device 116b does not receive the digital content 111. Indeed, as described above, the control data set does not include the digital content 111.

Continuing the discussion of FIG. 4, sequence 400 illustrates that the respondent client device 116b performs act 424 to receive user input for a response. Similar to the discussion above in relation to the respondent client device 116a and the exposure data set, the respondent client device 116b also receives user input from a respondent 120b. In particular, the respondent client device 116b receives user input in the form of answers to digital survey questions. Based on those received answers, the respondent client device 116b performs act 426 to provide a response to the digital content survey system 106 that indicates the answers input by the respondent 120b.

Figure 5A:
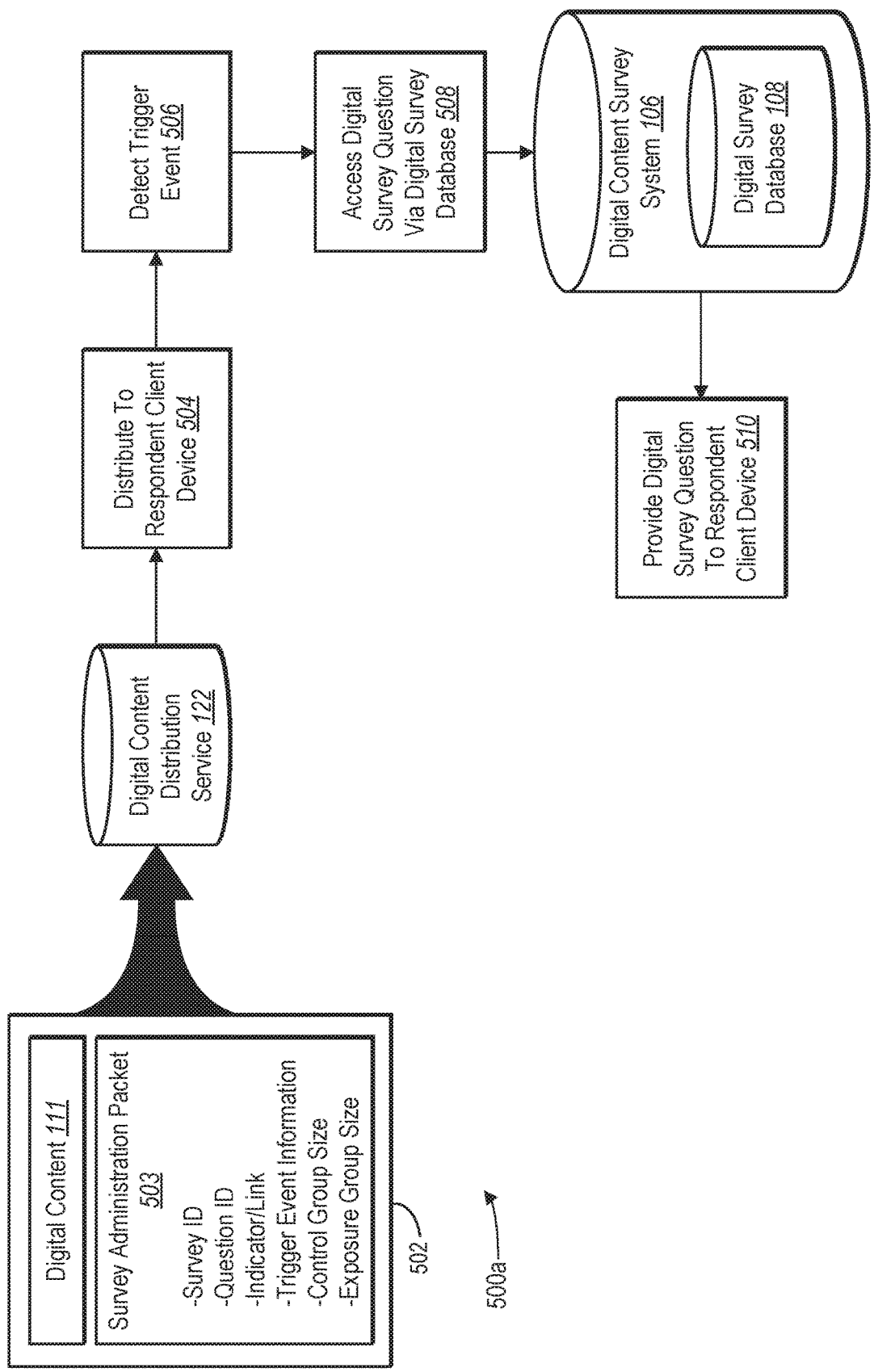
FIGS. 5A-5B illustrate example process flows using a survey administration packet in accordance with one or more embodiments.
Figure 5B:
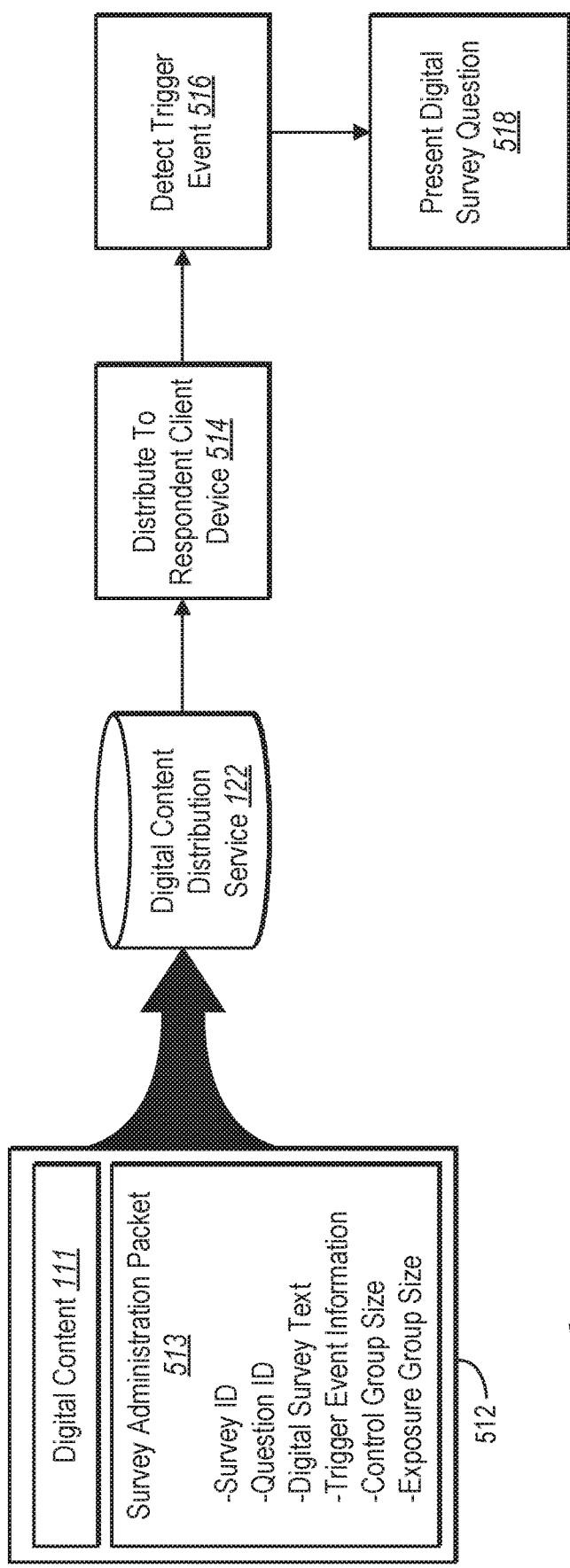

As described above, the digital content survey system 106 generates a survey administration packet. The digital content survey system 106 can generate a linked survey administration packet or an embedded survey administration packet. FIGS. 5A and 5B illustrate the differences between the two and the different functions that each survey administration packet causes a computing device to perform.

FIG. 5A illustrates a flow 500a in relation to a linked survey administration packet. As illustrated in FIG. 5A, the flow 500a includes an exposure data set 502 that includes the digital content 111 and the linked survey administration packet 503. The flow 500a further includes the digital content distribution service 122, the digital content survey system 106 including the digital survey database 108, and acts 504-510 performed by one or more of the digital content distribution service 122, the digital content survey system 106, and a respondent client device (e.g., respondent client device 116a).

As illustrated in FIG. 5A, the linked survey administration packet 503 includes a survey identifier, a question identifier, an indicator or link to a digital survey (including digital survey questions) located on a digital survey database 108, a control group size, and an exposure group size. Indeed, the survey administration packet 503 includes the information necessary to cause the digital content distribution service 122 to distribute the exposure data set 502 to exposure group and the control group (although FIG. 5A depicts acts only for the exposure group). In addition, the survey administration packet 503 includes the information and instructions necessary to cause the respondent client device 116a to perform the acts described above.

As mentioned, and as illustrated in FIG. 5A, the digital content distribution service 122 performs act 504 to distribute the exposure data set 502 to a respondent client device (e.g., respondent client device 116a). Upon receiving the exposure data set 502, the respondent client device 116a performs act 506 to detect a trigger event, as described in further detail above. For instance, the respondent client device 116a detects the expiration of a threshold period of time since the respondent client device 116a began presenting the digital content 111. The trigger event is defined by the trigger event information included in the survey administration packet 503.

Upon detecting the trigger event (act 506), the respondent client device 116a requests access or otherwise retrieves a digital survey question maintained by the digital content survey system 106 on a digital survey database 108, as shown by act 508 of FIG. 5A. Indeed, because the survey administration packet 503 is a linked survey administration packet, the survey administration packet 503 causes the respondent client device 116a to perform act 508 to request a digital survey question that is not included directly within the survey administration packet 503. To request the digital survey question, the respondent client device 116a provides the survey identifier and the question identifier included in the survey administration packet 503 to access the corresponding digital survey question within the digital survey database 108.

In response to receiving the request to access the digital survey question from the digital survey database 108, the digital content survey system 106 performs act 510 to provide the digital survey question to the respondent client device 116a. In particular, the digital content survey system 106 provides the text of the digital survey question from a digital survey that matches the survey identifier included in the survey administration packet 503. Likewise, the digital content survey system 106 provides the digital survey question that matches the question identifier included as part of the survey administration packet 503, as shown in FIG. 5A. Additional acts that the digital content survey system 106 and respondent client device 116a perform based on the digital content survey system 106 providing the digital survey question to the respondent client device 116a are discussed above with reference to the previous figures.

FIG. 5B illustrates a flow 500b in relation to an embedded survey administration packet. As illustrated in FIG. 5B, the flow 500b includes an exposure data set 512 that includes the digital content 111 and an embedded survey administration packet 513. The flow 500b further includes the digital content distribution service 122 and acts 514-518.

As shown in FIG. 5B, the embedded survey administration packet 513 includes a survey identifier, a question identifier, digital survey text, trigger event information, control group size, and exposure group size. Unlike the linked survey administration packet 503 of FIG. 5A, the embedded survey administration packet 513 includes digital survey text. In particular, the digital survey text includes digital survey questions and answer choices for one or more digital survey questions that are part of the digital survey.

FIG. 5B illustrates that the digital content distribution service 122 distributes the exposure data set to a respondent client device (e.g., respondent client device 116a). As mentioned above, the survey administration packet 513 includes instructions that cause the respondent client device 116a to present the digital content 111 and to perform act 516 to detect a trigger event. However, unlike the discussion in relation to FIG. 5A, the survey administration packet 513 does not cause the respondent client device to request access to a digital survey question from the digital content survey system 106 and/or digital survey database 108. Instead, the survey administration packet 513 causes the respondent client device 116a to present the digital survey question that is stored within the survey administration packet 513 itself. Accordingly, the respondent client device 116a need not request access via network 102, but may instead only require local processes to access and present—i.e., replace the digital content 111 with—the digital survey question, as shown by act 518 of FIG. 5B.

While FIGS. 5A and 5B illustrate exposure data sets 502 and 512, respectively, it will be understood from the disclosure herein that the digital content distribution service 122 also distributes a control data set in one or more of the embodiments described in relation to FIGS. 5A and 5B. As described above, the control data set includes a survey administration packet (e.g., the linked survey administration packet 503 or the embedded survey administration packet 513), but does not include the digital content 111. Therefore, the respondent client device that receives the control data set does not present any digital content, but instead presents a digital survey question. Additional detail regarding the control data set is provided above.

Additional acts that the digital content survey system 106 and respondent client device 116a perform based on the digital content survey system 106 providing the digital survey question to the respondent client device 116a are discussed above with reference to the previous figures.

Figure 6B:
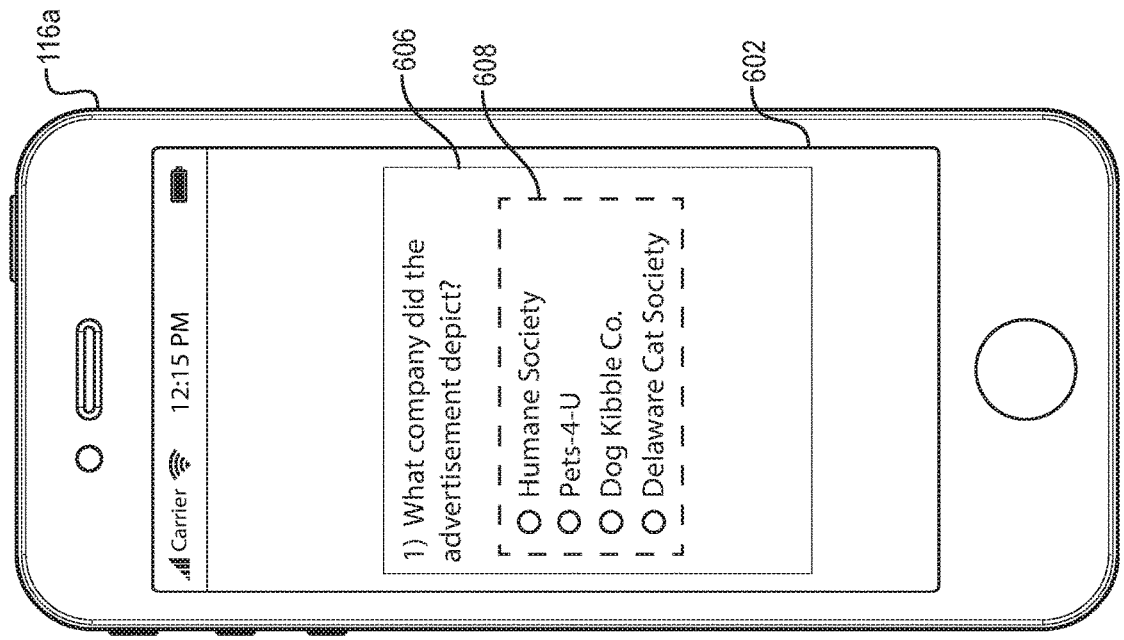
FIGS. 6A-6C illustrate example respondent client devices presenting example graphical user interfaces in accordance with one or more embodiments.
Figure 6A:
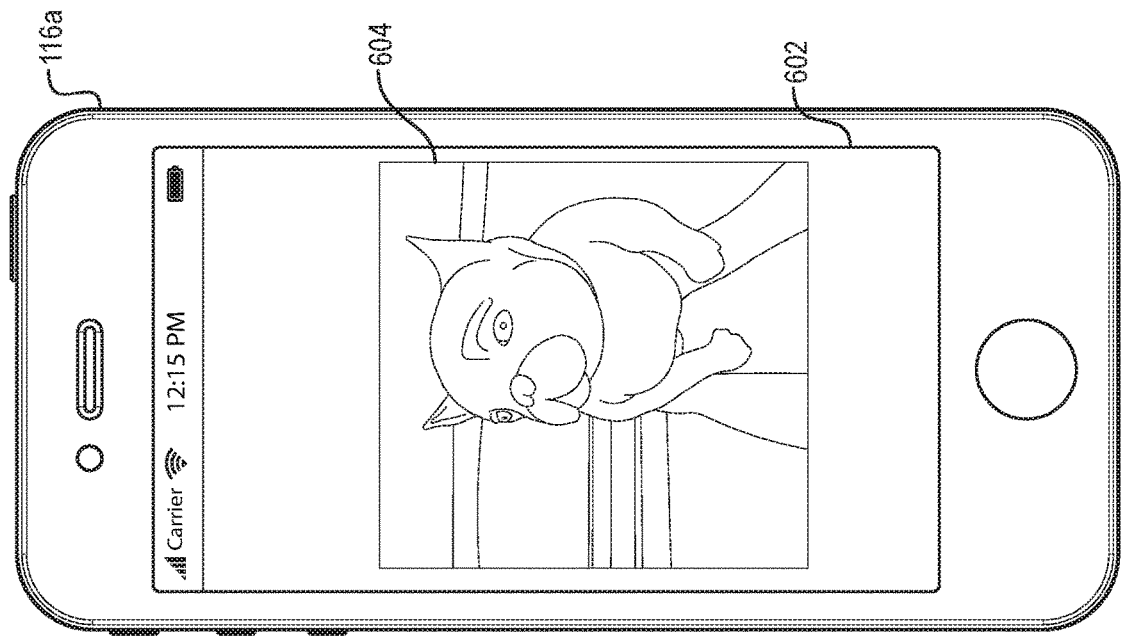
Figure 6C:
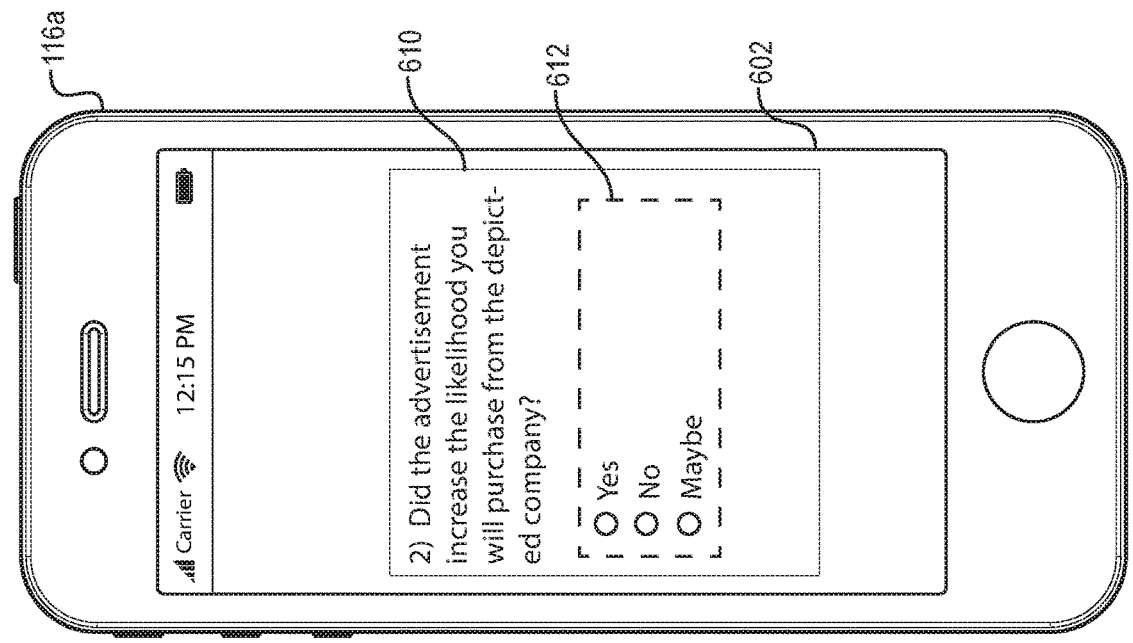

FIGS. 6A-6C illustrate the respondent client device 116a and the GUIs that the respondent client device 116a presents based on the acts described above. For example, FIG. 6A illustrates the respondent client device 116a presenting digital content 604 via a display 602. As shown in FIG. 6A, digital content 604 is a graphical (e.g., still image) advertisement for a pet store. The respondent client device 116a presents the digital content 604 in response to receiving the exposure data set described above.

FIG. 6B illustrates the same respondent client device 116a presenting a digital survey question 606 by way of the display 602. The respondent client device 116a may present the digital survey question 606 as a result of detecting a trigger event. For example, the respondent client device 116a may detect an expiration of a threshold period of time whereupon the respondent client device 116a replaces the presentation of the digital content 604 with the presentation of the digital client device 606. Alternatively, the respondent client device 116a may detect a user interaction such as a tap on the display 602 by the respondent 120a to trigger the respondent client device 116a to replace the digital content 604 with the digital survey question 606.

As illustrated in FIG. 6B, the digital survey question 606 also includes answer choices 608. Indeed, the answer choices 608 include options for the respondent 120a to answer the digital survey question. In response to receiving a selection of one of the answer choices 608, the respondent client device 116a may provide a survey response indicating the answer choice to the digital content survey system 106, as described above. Additionally, the respondent client device 116a may further advance the digital survey to present a subsequent digital survey question, as illustrated in FIG. 6C.

As illustrated in FIG. 6B, the digital survey question 606 asks "What company did the advertisement depict?" Based on the response that the digital content survey system 106 receives (e.g., whether the response is correct or incorrect), the digital content survey system 106 can analyze the response together with other responses from other respondent client devices 116 to determine an impact of the digital content 604. For example, the digital content survey system 106 can determine whether the digital content 604 is effective enough to cause respondents 120 to answer the digital survey question 606 correctly. Thus, the digital content survey system 106 can determine how effective (e.g., based on a scale or score of effectiveness) the digital content 604 is at portraying a brand.

While FIG. 6B represents the respondent client device 116a as part of the exposure group, it will be understood from the disclosure herein that respondent client device 116b may present the same digital survey question 606 and the same answer choices 608 without first presenting the digital content 604 of FIG. 6A. Likewise, the respondent client device 116b can present the digital survey question 610 and the answer choices 612 of FIG. 6C, described in more detail hereafter.

As mentioned, in response to receiving user input to select an answer choice for the digital survey question 606, the respondent client device 116a replaces the presentation of the digital survey question 606 with a presentation of digital survey question 610. Indeed, the survey administration packet may cause the respondent client device 116a to iteratively present one digital survey question after another until the digital survey is complete—i.e., until every digital survey question is presented and/or answered.

As illustrated in FIG. 6C, the digital survey question 610 asks "Did the advertisement increase the likelihood you will purchase from the depicted company?" Based on responses that the digital content survey system 106 receives to this digital survey question 610, the digital content survey system 106 can determine an impact of the digital content 604 that, in addition to indicating an effectiveness in portraying a brand, also indicates an effectiveness in influencing conversions (e.g., purchases). Accordingly, based on responses to the digital survey questions 606 and 610, the digital content survey system 106 can generate survey results that indicate the impact of the digital content 604, and can further provide the survey results to the publisher client device 110. Thus, the publisher 114 may act accordingly to adjust a digital content campaign as necessary to increase effectiveness.

Figure 7:
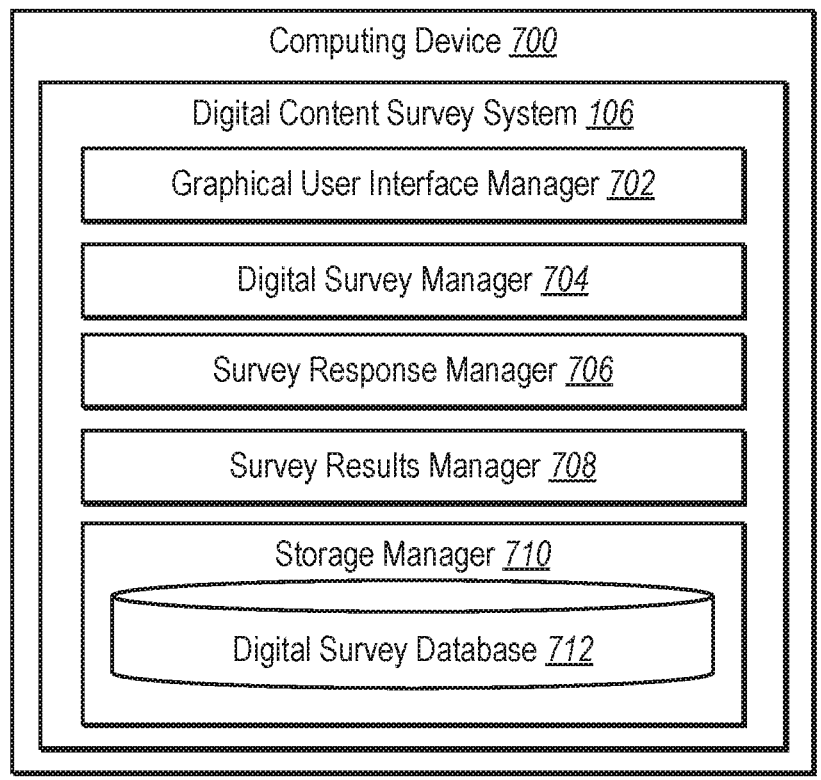
FIG. 7 illustrates a schematic diagram of a digital content survey system in accordance with one or more embodiments.

Turning now to FIG. 7, additional detail will be provided regarding components and capabilities of the digital content survey system 106. Specifically, FIG. 7 illustrates an example schematic diagram of the digital content survey system 106 on an exemplary computing device 700 (e.g., the server(s) 104). As shown in FIG. 7, the digital content survey system 106 may include a graphical user interface manager 702, a digital survey manager 704, a survey response manager 706, a survey results manager 708, and a storage manager 710 that can include a digital survey database 712. While FIG. 7 depicts a particular number of components, in some embodiments, the digital content survey system 106 may include more or fewer components. In addition, the components may perform additional or alternative tasks than those described hereafter.

As mentioned, the digital content survey system 106 includes a graphical user interface manager 702. In particular, the graphical user interface manager 702 generates and provides a GUI such as GUI 300. For instance, the graphical user interface manager 702 generates a GUI with a particular layout of GUI elements and selectable options, whereby the publisher 114 can input preferences, settings, and other information for a digital content campaign that includes a digital survey together with digital content. Furthermore, the graphical user interface manager 702 can generate those portions of the survey administration packet that cause a respondent client device (e.g., respondent client device 116a or 116b) to present the various elements described above.

The digital content survey system 106 also includes a digital survey manager 704. In particular, the digital survey manager creates or generates the survey administration packet for distribution to respondent client devices 116. For example, the digital survey manager 704 generates a linked survey administration packet and an embedded survey administration packet for distribution to respondent client devices 116 based on the disclosure herein. Furthermore, the digital survey manager 704 generates the exposure data set and the control data set to include the digital content 111 and the survey administration packet for distribution to the exposure group and the control group, as described above. In addition, the digital survey manager 704 associates the survey administration packet with the digital content for distribution to the respondent client devices 116. To illustrate, the digital survey manager 704 assigns a survey identifier to a particular digital survey, and assigns question identifiers to each digital survey question included as part of the digital survey.

As illustrated in FIG. 7, the digital content survey system 106 further includes a survey response manager 706. In particular, the survey response manager 706 receives survey responses from respondent client devices 116. The survey response manager 706 collects or gathers responses, and associates each response with its respective digital survey question and digital survey by identifying the survey identifier and question identifier associated with each received survey response.

As further illustrated in FIG. 7, the digital content survey system 106 includes a survey results manager 708. The survey results manager 708 generates survey results based on the received survey responses. For instance, the survey results manager 708 determines an impact of digital content (e.g., digital content 111) based on the responses received in relation to the digital content 111. Additionally, the survey results manager 708 provides survey results indicating the impact of the digital content 111 to the publisher computing device 110, thereby providing actionable information to a publisher 114 to improve the effectiveness of a digital content campaign.

The digital content survey system 106 further includes a storage manager 710. In particular, the storage manager 710 includes a digital survey database 712. To illustrate, the digital survey database 712 may represent digital survey database 108 described above. The storage manager 710 may store, maintain, and manage digital survey information pertaining to digital surveys within the digital survey database 712. For example, the storage manager 710 may organize each digital survey according to a survey identifier associated with the digital survey, and may further organize each digital survey question within a given digital survey according to a question identifier associated with the digital survey question. Indeed, the survey identifier and the question identifier may be metadata attached to, included within, or otherwise associated with a digital survey or digital survey question.

Furthermore, the storage manager 710 may store and organize survey results within the digital survey database 712 as well. In addition, the survey results may also include a survey identifier whereby the storage manager 710 associates the survey results to a particular digital survey. The storage manager 710 may maintain survey results to provide the survey results to digital content publishers (e.g., publisher 114) on more than one occasion (e.g., upon request).

Figure 8:
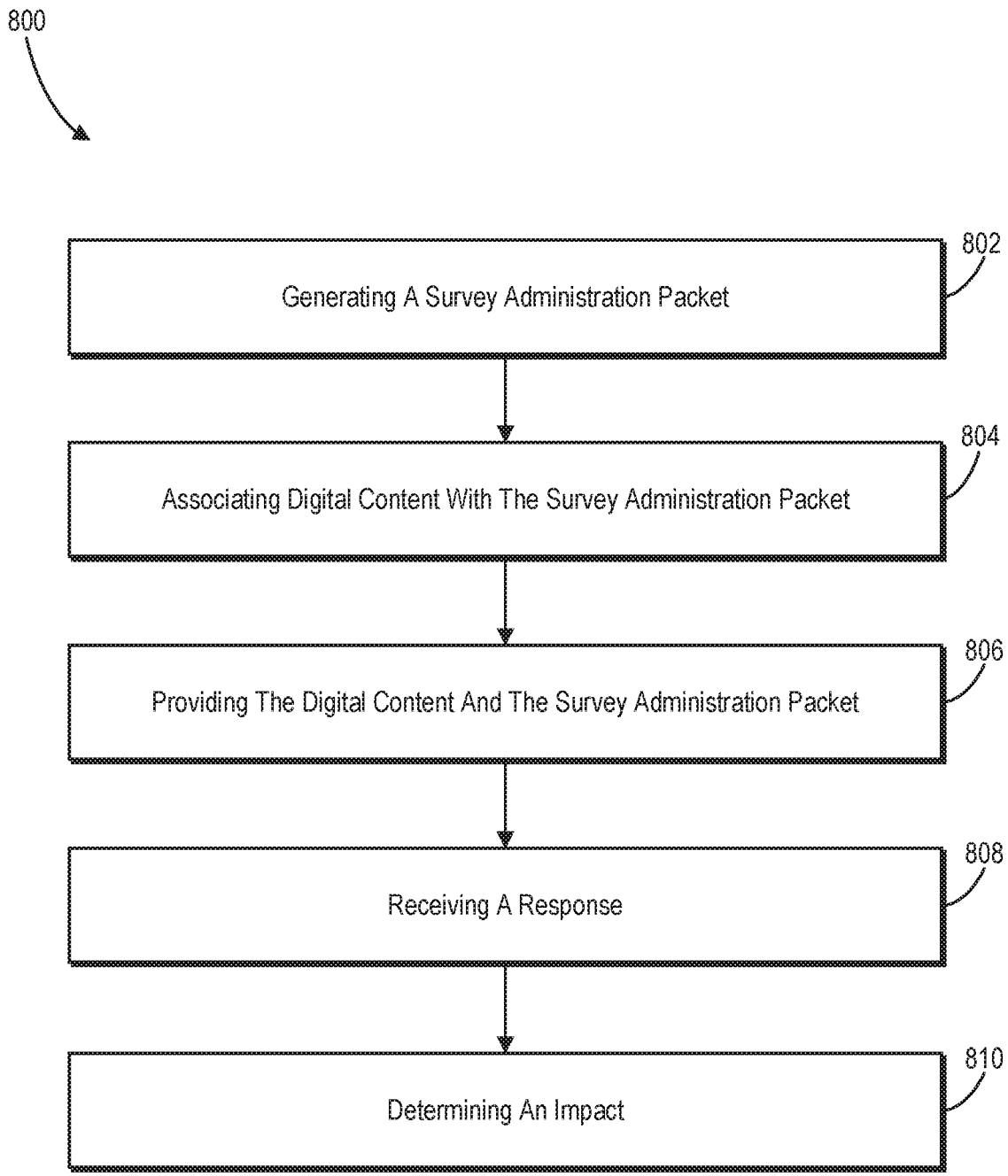
FIG. 8 illustrates a flowchart of a series of acts in a method of determining an impact of digital content in accordance with one or more embodiments.

FIGS. 1-7, the corresponding text, and the examples provide a number of different systems and methods for determining an impact of digital content by administering digital surveys. In addition to the foregoing, embodiments can also be described in terms of flowcharts comprising acts steps in a method for accomplishing a particular result. For example, turning now to FIG. 8, this figure illustrates a flowchart of a series of acts 800 of determining an impact of digital content based on a survey administration packet. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8.

As illustrated in FIG. 8, the series of acts 800 may include an act 802 of generating a survey administration packet. In particular, the act 802 may involve generating a survey administration packet for a digital survey including at least one digital survey question. The act 802 can include receiving, from a publisher client device, instructions for administering the digital survey. The survey administration packet can include the at least one digital survey question and instructions to present the at least one digital survey question in response to the respondent client device detecting the trigger event.

The series of acts 800 may also include an act 804 of associating digital content with the survey administration packet. In particular, the act 804 can involve associating, by at least one processor, digital content to be provided to a respondent client device with the survey administration packet. For example, the act 804 can include generating an exposure data set comprising the digital content and the survey administration packet.

As further illustrated in FIG. 8, the series of acts 800 can include an act 806 of providing the digital content and the survey administration packet. In particular, the act 806 can involve providing the digital content and the survey administration packet to a digital content distribution service for distribution to the respondent client device, wherein receiving the digital content and the survey administration packet causes the respondent client device to present the digital content and, in response to detecting a trigger event defined by the survey administration packet, replace the presentation of the digital content with a presentation of the at least one digital survey question of the digital survey. The act 806 can include providing the exposure data set to the digital content distribution service for distribution to the respondent client device. Detecting the trigger event can include detecting that a threshold period of time has expired since the respondent client device began presenting the digital content.

The series of acts 800 can further include an act 808 of receiving a response. In particular, the act 808 can involve receiving, from the respondent client device, a response to the at least one digital survey question. As illustrated in FIG. 8, the series of acts 800 can still further include an act 810 of determining an impact. In particular, the act 810 can involve determining an impact of the digital content based at least in part on the response.

Though not illustrated in FIG. 8, the series of acts 800 can further include an act of generating a control data set comprising the survey administration packet, wherein the survey control set does not include the digital content. The series of acts 800 can also include an act of providing the survey control set to the digital content distribution service for distribution to a different respondent client device, wherein, upon the different respondent client device receiving the survey control set, the survey administration packet causes the different respondent client device to present the at least one digital survey question without the digital content. In addition, the series of acts 800 can include an act of receiving, from the different respondent client device, a response to the at least one digital survey question. Indeed, determining the impact of the digital content can be further based on the response received from the different respondent client device.

The series of acts 800 can still further include acts of receiving an indication of a user interaction with the digital content by way of the respondent client device and automatically populating an answer to the at least one digital survey question based on the indication of the user interaction with the digital content. The series of acts 800 can also include an act of providing, to a publisher client device, a graphical user interface comprising a plurality of selectable options, wherein the plurality of selectable options comprises options to define the trigger event and the survey administration packet, as well as an act of providing, based on the received response, alternative digital content to the digital content distribution service for distribution to replace the digital content distributed to the respondent client device.

In addition, the series of acts 800 can include an act of receiving an indication of a user interaction with the digital content by way of the respondent client device, and can include an act of automatically populating an answer to the at least one digital survey question based on the indication of the user interaction with the digital content, wherein the at least one digital survey question comprises two or more digital survey questions that are both populated based on the received indication of the user interaction with the digital content.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
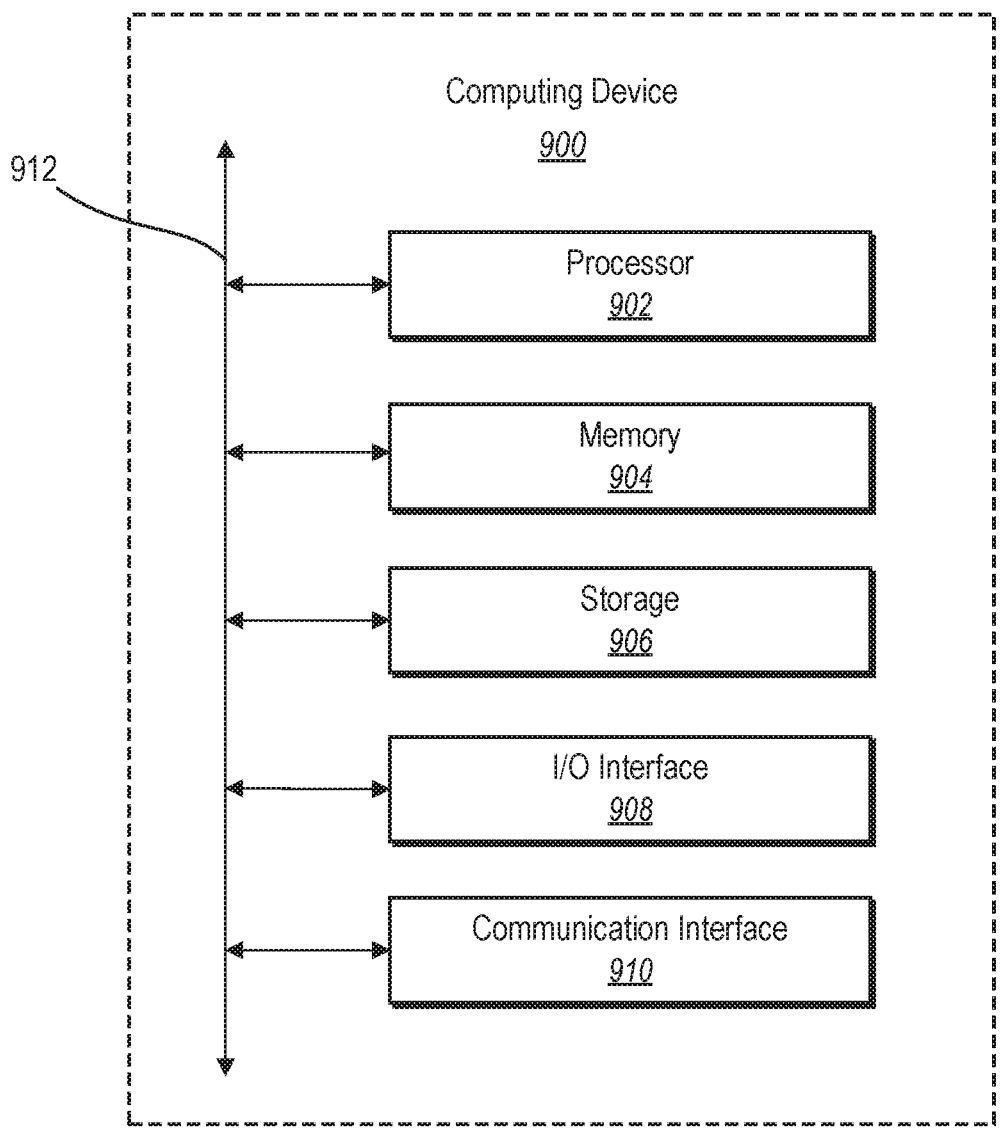
FIG. 9 illustrates a block diagram of an exemplary computing device in accordance with one or more embodiments.

FIG. 9 illustrates, in block diagram form, an exemplary computing device 900 that can be configured to perform one or more of the processes described above. One will appreciate that the digital content survey system 112 can comprise implementations of the computing device 900. As shown by FIG. 9, the computing device can comprise a processor 902, memory 904, a storage device 906, an I/O interface 908, and a communication interface 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 can retrieve (or fetch) the instructions from an internal register, an internal cache, memory 904, or a storage device 906 and decode and execute them.

The computing device 900 includes memory 904, which is coupled to the processor(s) 902. The memory 904 can be used for storing data, metadata, and programs for execution by the processor(s). The memory 904 can include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1204 can be internal or distributed memory.

The computing device 900 includes a storage device 906 includes storage for storing data or instructions. As an example, and not by way of limitation, storage device 906 can comprise a non-transitory storage medium described above. The storage device 906 can include a hard disk drive (HDD), flash memory, a Universal Serial Bus (USB) drive or a combination of these or other storage devices.

The computing device 900 also includes one or more input or output ("I/O") devices/interfaces 908, which are provided to allow a user to provide input to (such as user strokes), receive output from, and otherwise transfer data to and from the computing device 900. These I/O devices/interfaces 908 can include a mouse, keypad or a keyboard, a touch screen, camera, optical scanner, network interface, modem, other known I/O devices or a combination of such I/O devices/interfaces 908. The touch screen can be activated with a stylus or a finger.

The I/O devices/interfaces 908 can include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 908 is configured to provide graphical data to a display for presentation to a user. The graphical data can be representative of one or more graphical user interfaces and/or any other graphical content as can serve a particular implementation.

The computing device 900 can further include a communication interface 910. The communication interface 910 can include hardware, software, or both. The communication interface 910 can provide one or more interfaces for communication (such as, for example, packet-based communication) between the computing device and one or more other computing devices 900 or one or more networks. As an example, and not by way of limitation, communication interface 910 can include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can comprise hardware, software, or both that couples components of computing device 900 to each other.

Figure 10:
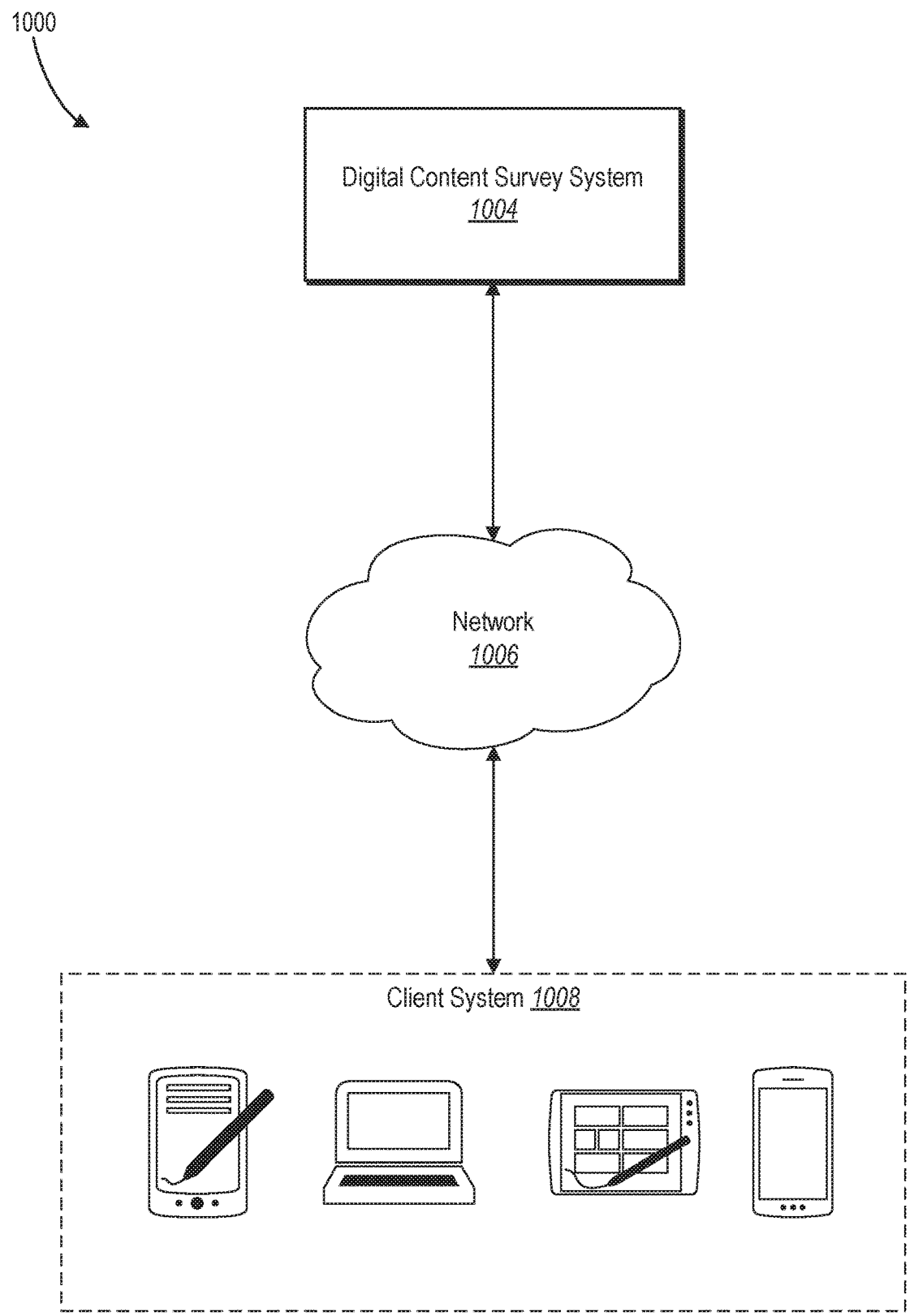
FIG. 10 illustrates an example digital content survey system in accordance with one or more embodiments.

FIG. 10 illustrates an example network environment 1000 of a digital content survey system. Network environment 1000 includes a client system 1008 and a digital content survey system 1004 connected to each other by a network 1006. Although FIG. 10 illustrates a particular arrangement of client system 1008, digital content survey system 1004, and network 1006, this disclosure contemplates any suitable arrangement of client system 1008, digital content survey system 1004, and network 1006. As an example, and not by way of limitation, two or more of client system 1008, digital content survey system 1004, bypassing network 1006. As another example, two or more of client system 1008, and digital content survey system 1004 can be physically or logically co-located with each other in whole or in part. Moreover, although FIG. 10 illustrates a particular number of client systems 1008, digital content survey system 1004, and networks 1006, this disclosure contemplates any suitable number of client systems 1008, digital content survey system 1004, and networks 1006. As an example, and not by way of limitation, network environment 1000 can include multiple client system 1008, digital content survey system 1004, and networks 1006.

This disclosure contemplates any suitable network 1006. As an example, and not by way of limitation, one or more portions of network 1006 can include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1006 can include one or more networks 1006.

Links can connect client system 1008, and digital content survey system 1004 to communication network 1006 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links can differ in one or more respects from one or more second links.

In particular embodiments, client system 1008 can be an electronic device including hardware, software, or embedded logic components or a combination of two or more such components and capable of carrying out the appropriate functionalities implemented or supported by client system 1008. As an example, and not by way of limitation, a client system 1008 can include any of the computing devices discussed above in relation to FIG. 10. A client system 1008 can enable a network user at client system 1008 to access network 1006. A client system 1008 can enable its user to communicate with other users at other client systems 1008.

In particular embodiments, client system 1008 can include a web browser, such as MICROSOFT INTERNET EXPLORER, GOOGLE CHROME or MOZILLA FIREFOX, and can have one or more add-ons, plug-ins, or other extensions, such as TOOLBAR or YAHOO TOOLBAR. A user at client system 1008 can enter a Uniform Resource Locator (URL) or other address directing the web browser to a particular server (such as server), and the web browser can generate a Hyper Text Transfer Protocol (HTTP) request and communicate the HTTP request to server. The server can accept the HTTP request and communicate to client system 1008 one or more Hyper Text Markup Language (HTML) files responsive to the HTTP request. Client system 1008 can render a webpage based on the HTML files from the server for presentation to the user. This disclosure contemplates any suitable webpage files. As an example, and not by way of limitation, webpages can render from HTML files, Extensible Hyper Text Markup Language (XHTML) files, or Extensible Markup Language (XML) files, according to particular needs. Such pages can also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser can use to render the webpage) and vice versa, where appropriate.

In particular embodiments, digital content survey system 1004 can be a network-addressable computing system that can host an online chat network. Digital content survey system 1004 can generate, store, receive, and send chat question, chat response data, such as, for example, user-profile data, concept-profile data, text data, or other suitable data related to the online chat network. Digital content survey system 1004 can be accessed by the other components of network environment 1000 either directly or via network 1006. In particular embodiments, digital content survey system 1004 can include one or more servers. Each server can be a unitary server or a distributed server spanning multiple computers or multiple datacenters. Servers can be of various types, such as, for example and without limitation, web server, news server, mail server, message server, advertising server, file server, application server, exchange server, database server, proxy server, another server suitable for performing functions or processes described herein, or any combination thereof. In particular embodiments, each server can include hardware, software, or embedded logic components or a combination of two or more such components for carrying out the appropriate functionalities implemented or supported by server. In particular embodiments, digital content survey system 1004 can include one or more data stores. Data stores can be used to store various types of information. In particular embodiments, the information stored in data stores can be organized according to specific data structures. In particular embodiments, each data store can be a relational, columnar, correlation, or other suitable database. Although this disclosure describes or illustrates particular types of databases, this disclosure contemplates any suitable types of databases. Particular embodiments can provide interfaces that enable a client system 1008, or a digital content survey system 1004 to manage, retrieve, modify, add, or delete, the information stored in data store.

In particular embodiments, digital content survey system 1004 can provide users with the ability to take actions on various types of items or objects, supported by digital content survey system 1004. As an example, and not by way of limitation, the items and objects can include groups or chat networks to which users of digital content survey system 1004 can belong, events or calendar entries in which a user might be interested, computer-based applications that a user can use, transactions that allow users to buy or sell items via the service, interactions with advertisements that a user can perform, or other suitable items or objects. A user can interact with anything that is capable of being represented in digital content survey system 1004 or by an external system of a third-party system, which is separate from digital content survey system 1004 and coupled to digital content survey system 1004 via a network 1006.

In particular embodiments, digital content survey system 1004 can be capable of linking a variety of entities. As an example, and not by way of limitation, digital content survey system 1004 can enable users to interact with each other or other entities, or to allow users to interact with these entities through an application programming interfaces (API) or other communication channels.

In particular embodiments, digital content survey system 1004 also includes user-generated content objects, which can enhance a user's interactions with digital content survey system 1004. User-generated content can include anything a user can add, upload, send, or "post" to digital content survey system 1004. As an example, and not by way of limitation, a user communicates chats to digital content survey system 1004 from a client system 1008. Chats can include data such as chat questions or other textual data, location information, photos, videos, links, music or other similar data or media. Content can also be added to digital content survey system 1004 by a third-party through a "communication channel," such as a newsfeed or stream.

In particular embodiments, digital content survey system 1004 can include a variety of servers, sub-systems, programs, modules, logs, and data stores. In particular embodiments, digital content survey system 1004 can include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Digital content survey system 1004 can also include suitable components such as network interfaces, security mechanisms, load balancers, failover servers, management-and-network-operations consoles, other suitable components, or any suitable combination thereof. In particular embodiments, digital content survey system 1004 can include one or more user-profile stores for storing user profiles. A user profile can include, for example, biographic information, demographic information, behavioral information, social information, or other types of descriptive information, such as work experience, educational history, hobbies or preferences, interests, affinities, or location.

The web server can include a mail server or other messaging functionality for receiving and routing messages between digital content survey system 1004 and one or more client systems 1008. An action logger can be used to receive communications from a web server about a user's actions on or off digital content survey system 1004. In conjunction with the action log, a third-party-content-object log can be maintained of user exposures to third-party-content objects. A notification controller can provide information regarding content objects to a client system 1008. Information can be pushed to a client system 1008 as notifications, or information can be pulled from client system 1008 responsive to a request received from client system 1008. Authorization servers can be used to enforce one or more privacy settings of the users of digital content survey system 1004. A privacy setting of a user determines how particular information associated with a user can be shared. The authorization server can allow users to opt in to or opt out of having their actions logged by digital content survey system 1004 or shared with other systems, such as, for example, by setting appropriate privacy settings. Third-party-content-object stores can be used to store content objects received from third parties. Location stores can be used for storing location information received from client systems 1008 associated with users.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention can be embodied in other specific forms without departing from its spirit or essential characteristics. The described embodiments are to be considered in all respects only as illustrative and not restrictive. For example, the methods described herein can be performed with less or more steps/acts or the steps/acts can be performed in differing orders. Additionally, the steps/acts described herein can be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
   generating, for a digital survey comprising at least one digital survey question, a survey administration packet comprising the at least one digital survey question, content reconfiguring instructions and trigger event information defining a trigger event for initializing the content reconfiguring instructions to modify a presentation of digital content with a presentation of the digital survey;
   associating, by at least one processor, digital content to be provided to a respondent client device with the survey administration packet;
   providing the digital content and the survey administration packet to a digital content distribution service for distribution to the respondent client device, wherein distribution of the survey administration packet to the respondent client device causes the respondent client device to, without requesting the at least one digital survey question from a database:
      provide a presentation of the digital content before presenting the digital survey; and
      in response to detecting the trigger event defined by the trigger event information of the survey administration packet, access the content reconfiguring instructions of the survey administration packet to modify the presentation of the digital content with a presentation of the at least one digital survey question of the digital survey;
   receiving an indication of a user interaction with the digital content by way of the respondent client device; and
   automatically populating an answer to the at least one digital survey question based on the indication of the user interaction with the digital content without receiving user interaction in relation to the at least one digital survey question.

2. The method of claim 1, wherein distribution of the survey administration packet to the respondent client device further causes the respondent client device to detect the trigger event defined by the trigger event information of the survey administration packet.

3. The method of claim 1, wherein the content reconfiguring instructions comprise instructions to, in response to the respondent client device detecting the trigger event and without requesting the at least one digital survey question from the database, modify the presentation of the digital content by replacing the presentation of the digital content with the presentation of the at least one digital survey question.

4. The method of claim 1, wherein the content reconfiguring instructions comprise instructions to, in response to the respondent client device detecting the trigger event and without requesting the at least one digital survey question from the database, modify the presentation of the digital content by reducing a size of the digital content and including the at least one digital survey question together with the presentation of the digital content.

5. The method of claim 4, wherein:
the content reconfiguring instructions comprise instructions to, in response to the respondent client device detecting the trigger event and without requesting the at least one digital survey question from the database, reduce the size of the digital content displayed within a portion of a webpage to include the at least one digital survey question within the portion of the webpage together with the presentation of the digital content.

6. The method of claim 1, further comprising:
generating a control data set including the survey administration packet and excluding the digital content; and
providing the control data set to the digital content distribution service for distribution to a different respondent client device, wherein, upon the different respondent client device receiving the control data set, the survey administration packet causes the different respondent client device to, without requesting the at least one digital survey question from the database, provide a presentation of the at least one digital survey question without providing a presentation of the digital content.

7. The method of claim 6, further comprising determining an impact of the digital content based on a response corresponding to the at least one digital survey question received from the respondent client device, and further based on a response received from the different respondent client device.

8. The method of claim 1, wherein detecting the trigger event comprises detecting that a threshold period of time has expired since a start of the presentation of the digital content on the respondent client device.

9. A non-transitory computer readable medium comprising instructions that, when executed by at least one processor, cause a computer device to:
generate, for a digital survey comprising at least one digital survey question, a survey administration packet comprising the at least one digital survey question, content reconfiguring instructions and trigger event information defining a trigger event for initializing the content reconfiguring instructions to modify a presentation of digital content with a presentation of the digital survey;
associate, by at least one processor, digital content to be provided to a respondent client device with the survey administration packet;
provide the digital content and the survey administration packet to a digital content distribution service for distribution to the respondent client device, wherein distribution of the survey administration packet to the respondent client device causes the respondent client device to, without requesting the at least one digital survey question from a database:
provide a presentation of the digital content before presenting the digital survey; and
in response to detecting the trigger event defined by the trigger event information of the survey administration packet, access the content reconfiguring instructions of the survey administration packet to modify the presentation of the digital content with a presentation of the at least one digital survey question of the digital survey;
receive an indication of a user interaction with the digital content by way of the respondent client device; and
automatically populate an answer to the at least one digital survey question based on the indication of the user interaction with the digital content without receiving user interaction in relation to the at least one digital survey question.

10. The non-transitory computer readable medium of claim 9, further comprising instructions that, when executed by the at least one processor, cause the computer device to:
determine a time from beginning the presentation of the digital content to receiving the indication of the user interaction with the digital content; and
automatically populate, without receiving user interaction in relation to the at least one digital survey question, an answer to the at least one digital survey question further based on the time from beginning the presentation of the digital content to receiving the indication of the user interaction.

11. The non-transitory computer readable medium of claim 9, further comprising instructions that, when executed by the at least one processor, cause the computer device to:
generate a control data set including the survey administration packet and excluding the digital content; and
provide the control data set to the digital content distribution service for distribution to a different respondent client device, wherein, upon the different respondent client device receiving the control data set, the survey administration packet causes the different respondent client device to, without requesting the at least one digital survey question from the database, provide a presentation of the at least one digital survey question without providing a presentation of the digital content.

12. The non-transitory computer readable medium of claim 11, further comprising instructions that, when executed by the at least one processor, cause the computer device to determine an impact of the digital content based on a response corresponding to the at least one digital survey question received from the respondent client device, and further based on a response received from the different respondent client device.

13. The non-transitory computer readable medium of claim 9, wherein detecting the trigger event comprises detecting that a threshold period of time has expired since a start of the presentation of the digital content on the respondent client device.

14. A system comprising:
at least one processor; and
a non-transitory computer readable medium comprising instructions that, when executed by the at least one processor, cause the system to:
generate, for a digital survey comprising at least one digital survey question, a survey administration packet comprising the at least one digital survey question, content reconfiguring instructions and trigger event information defining a trigger event for initializing the content reconfiguring instructions to modify a presentation of digital content with a presentation of the digital survey;

associate, by at least one processor, digital content to be provided to a respondent client device with the survey administration packet;

provide the digital content and the survey administration packet to a digital content distribution service for distribution to the respondent client device, wherein distribution of the survey administration packet to the respondent client device causes the respondent client device to, without requesting the at least one digital survey question from a database:

provide a presentation of the digital content before presenting the digital survey; and in response to detecting the trigger event defined by the trigger event information of the survey administration packet, access the content reconfiguring instructions of the survey administration packet to modify the presentation of the digital content with a presentation of the at least one digital survey question of the digital survey;

receive an indication of a user interaction with the digital content by way of the respondent client device; and automatically populate an answer to the at least one digital survey question based on the indication of the user interaction with the digital content without receiving user interaction in relation to the at least one digital survey question.

15. The system of claim 14, further comprising instructions that, when executed by the at least one processor, cause the system to provide, to a publisher client device, a graphical user interface comprising a plurality of selectable options, wherein the plurality of selectable options comprises options to define the trigger event and the survey administration packet.

16. The system of claim 14, further comprising instruction that, when executed by the at least one processor, cause the system to:

determine a time from beginning the presentation of the digital content to receiving the indication of the user interaction with the digital content; and automatically populate, without receiving user interaction in relation to the at least one digital survey question, the answer to the at least one digital survey question based on the time from beginning the presentation of the digital content to receiving the indication of the user interaction.

17. The system of claim 14, further comprising instructions that, when executed by the at least one processor, cause the system to:

automatically populate the answer to the at least one digital survey question based on the received indication of the user interaction with the digital content, wherein the at least one digital survey question comprises two or more digital survey questions that are both populated based on the received indication of the user interaction with the digital content.

18. The system of claim 14, further comprising instructions that, when executed by the at least one processor, cause the system to:

generate a control data set including the survey administration packet and excluding the digital content; and receive, from a different respondent client device, a response to the at least one digital survey question.

19. The system of claim 18, further comprising instructions that, when executed by the at least one processor, cause the system to determine an impact of the digital content based on a response corresponding to the at least one digital survey question received from the respondent client device, and further based on the response received from the different respondent client device.

20. The system of claim 14, wherein detecting the trigger event comprises detecting that a threshold period of time has expired since a start of the presentation of the digital content on the respondent client device.

* * * * *